(12) United States Patent
Santurbane et al.

(10) Patent No.: US 12,391,327 B2
(45) Date of Patent: Aug. 19, 2025

(54) AUTOMATIC BICYCLE SYSTEM AND USER PROFILE IDENTIFICATION

(71) Applicant: SRAM, LLC, Chicago, IL (US)

(72) Inventors: Mark Santurbane, Colorado Springs, CO (US); Alex Ho, Chicago, IL (US); Brian Oberholtzer, Phoenixville, PA (US)

(73) Assignee: SRAM, LLC, Chicago, IL (US)

( * ) Notice: Subject to any disclaimer, the term of this patent is extended or adjusted under 35 U.S.C. 154(b) by 64 days.

(21) Appl. No.: 18/175,729

(22) Filed: Feb. 28, 2023

(65) Prior Publication Data

US 2024/0286698 A1  Aug. 29, 2024

(51) Int. Cl.
*B62J 45/20* (2020.01)
*B62J 45/412* (2020.01)
*B62J 45/414* (2020.01)
*B62J 50/22* (2020.01)
*B62J 50/25* (2020.01)
*H04L 67/12* (2022.01)
*H04L 67/306* (2022.01)

(52) U.S. Cl.
CPC ............ *B62J 45/20* (2020.02); *B62J 45/412* (2020.02); *B62J 45/414* (2020.02); *B62J 50/22* (2020.02); *B62J 50/25* (2020.02); *H04L 67/12* (2013.01); *H04L 67/306* (2013.01)

(58) Field of Classification Search
CPC ........ B62J 45/20; B62J 45/412; B62J 45/414; B62J 50/22; B62J 50/25; H04L 67/12; H04L 67/306
See application file for complete search history.

(56) References Cited

U.S. PATENT DOCUMENTS

| 8,364,389 | B2 * | 1/2013 | Dorogusker | B62J 45/20 |
| | | | | 702/182 |
| 8,705,527 | B1 | 4/2014 | Addepalli et al. | |
| 10,812,645 | B2 * | 10/2020 | Montez | H04M 1/04 |
| 11,615,710 | B2 * | 3/2023 | Seagraves | G06Q 10/02 |
| | | | | 705/13 |

(Continued)

FOREIGN PATENT DOCUMENTS

| CN | 107195015 A | 9/2017 |
| CN | 107680198 A | 2/2018 |

(Continued)

*Primary Examiner* — Mohamed Barakat

(57) ABSTRACT

A controller device usable with a bicycle includes a communication interface configured to receive component data from another controller device of the bicycle. The communication interface is configured to receive auxiliary data from outside the bicycle. The controller device includes a processor in communication with the communication interface. The processor being is configured to determine a location of the bicycle based on the auxiliary data, compare the received component data to a plurality of predetermined component datasets for a plurality of bicycles, respectively, and identify at least one bicycle of the plurality of bicycles based on the comparison and the determined location of the bicycle. The at least one bicycle includes the bicycle. The controller device includes a display in communication with the processor. The display is configured to display a representation for each bicycle of the at least one identified bicycle.

12 Claims, 19 Drawing Sheets

(56) References Cited

U.S. PATENT DOCUMENTS

| | | | |
|---|---|---|---|
| 2009/0181826 A1 | 7/2009 | Turner | |
| 2013/0150028 A1* | 6/2013 | Akins | H04W 4/029 |
| | | | 455/456.3 |
| 2017/0012455 A1 | 1/2017 | Kato et al. | |
| 2017/0160392 A1* | 6/2017 | Brisimitzakis | G01S 7/24 |
| 2017/0294054 A1 | 10/2017 | Rosenbaum | |
| 2017/0327184 A1* | 11/2017 | Contello | B62M 9/10 |
| 2017/0334522 A1* | 11/2017 | Zahid | H04W 4/029 |
| 2018/0013833 A1 | 1/2018 | Ostergaard | |
| 2018/0197401 A1* | 7/2018 | Khaligh | B62J 50/20 |
| 2018/0351557 A1 | 12/2018 | Jim et al. | |
| 2020/0250246 A1 | 8/2020 | Meyer | |
| 2021/0107579 A1* | 4/2021 | Adam | B60L 50/20 |

FOREIGN PATENT DOCUMENTS

| | | |
|---|---|---|
| CN | 108597216 A1 | 9/2018 |
| CN | 113548142 | 10/2021 |
| DE | 19931769 A1 | 1/2001 |
| DE | 102016005998 A1 | 1/2017 |
| EP | 3392128 A1 | 10/2018 |
| TW | 201516932 A | 5/2015 |
| TW | 201623087 | 7/2016 |
| TW | 202037526 | 10/2020 |
| TW | 202300393 | 1/2023 |
| TW | 202306834 | 2/2023 |
| WO | 2019011197 A1 | 1/2019 |

\* cited by examiner

| Bike ID | Friendly Bike Name | 1st component ID | 2nd component ID | 3rd component ID | 4th component ID | 5th component ID |
|---|---|---|---|---|---|---|
| bike_1 | TT road bike | front_derailleur_659 | rear_derailleur_131 | left_controller_557 | right_controller_359 | power_meter_701 |
| bike_2 | gravel bike | rear_derailleur_607 | left_controller_419 | right_controller_163 | power_meter_727 | |
| bike_3 | mountain bike | rear_derailleur_937 | right_controller_587 | right_controller_360 | seatpost_191 | shock_811 |

FIG. 9

| Bike ID | Friendly Bike Name | 1st profile | 2nd profile | 3rd profile | 4th profile |
|---|---|---|---|---|---|
| bike_1 | TT road bike | power + gear | power + heart rate | power + gear + heart rate | - |
| bike_2 | gravel bike | power + gear | power + gear + hills | - | - |
| bike_3 | mountain bike | gear + hills | - | - | - |

FIG. 12

AUTOMATIC BICYCLE SYSTEM AND USER PROFILE IDENTIFICATION

BACKGROUND

1. Field of the Disclosure

The present disclosure is generally directed to bicycle system identification, and more particularly, to bicycle system identification by a bicycle head unit.

2. Description of Related Art

A user of a bicycle head unit may own multiple bicycles, and may want to use the bicycle head unit on each of the multiple bicycles. Each of the multiple bicycles may be used in different conditions, and a desired head unit configuration may be different for each of the multiple bicycles.

SUMMARY

In one example, a controller device usable with a bicycle includes a communication interface configured to receive component data from another controller device. The other controller device is of the bicycle. The communication interface is further configured to receive auxiliary data from outside the bicycle. The controller device also includes a processor in communication with the communication interface. The processor is configured to determine a location of the bicycle based on the auxiliary data, compare the received component data to a plurality of predetermined component datasets for a plurality of bicycles, respectively, and identify at least one bicycle of the plurality of bicycles based on the comparison and the determined location of the bicycle. The at least one bicycle includes the bicycle. The controller device also includes a display in communication with the processor. The display is configured to display a representation for each bicycle of the at least one identified bicycle.

In one example, the controller device is a head unit that is usable with the at least one identified bicycle.

In one example, the communication interface includes a first communication interface configured to receive the component data from the other controller device, and a second communication interface configured to receive the auxiliary data from outside the bicycle. The first communication interface and the second communication interface are different types of communication interfaces, are configured to communicate using different techniques, protocols, or standards, or a combination thereof.

In one example, the second communication interface is configured to communicate with a WiFi network or a global positioning system (GPS). The auxiliary data includes data related to a WiFi device via which the second communication interface is connected to the WiFi network, GPS data, or a combination thereof.

In one example, the controller device also includes a memory configured to store the plurality of predetermined component datasets for the plurality of bicycles.

In one example, the received component data includes identification data for the other controller device. Each predetermined component dataset of the plurality of predetermined component datasets includes identification data for at least one component of the respective bicycle. The processor is further configured to determine whether, based on the comparison, the received identification data for the other controller device matches the identification data of the at least one bicycle of the plurality of bicycles. The identification includes identification of the at least one bicycle of the plurality of bicycles based on the determination of whether the received identification data for the other controller device matches the identification data of the at least one bicycle of the plurality of bicycles.

In one example, the memory is further configured to store predetermined location data for the plurality of bicycles, respectively. The processor is further configured to compare the determined location to the predetermined location data for the plurality of bicycles, respectively. The identification further includes identification of the at least one bicycle of the plurality of bicycles based on the comparison of the determined location to the predetermined location data for the plurality of bicycles, respectively.

In one example, the controller device also includes an input device. The processor is further configured to receive a user input selecting the representation of the bicycle via the input device. The processor is further configured to initiate display of one or more predetermined types of data by the display based on the received user input, initiate configuration of one or more components of the bicycle based on the received user input, or a combination thereof.

In one example, a controller device for a bicycle includes a communication interface configured to receive component data from another controller device of the bicycle. The controller device also includes a processor in communication with the communication interface. The processor is configured to identify the bicycle based on the received component data and identify sensor data from a sensor. The processor is further configured to determine an operative state of the bicycle based on the identified sensor data, and identify a user profile from a plurality of user profiles based on the determined operative state of the bicycle. The controller device also includes a display in communication with the processor. The display is configured to display one or more predetermined types of data based on the identified user profile, the processor is further configured to initiate configuration of one or more components of the bicycle based on the identified user profile, or a combination thereof.

In one example, the controller device also includes a memory configured to store the plurality of user profiles. Each user profile of the plurality of user profiles identifies at least one predetermined type of data to be displayed, a configuration for at least one component of the bicycle, or a combination thereof.

In one example, each user profile of the plurality of user profiles also includes one or more predetermined operative states. The identification of the user profile from the plurality of user profiles includes comparison of the identified sensor data to the respective one or more predetermined operative states for the user profile, and identification of the user profile from the plurality of user profiles based on the comparison.

In one example, the user profile is a profile specific to a particular rider of the bicycle, a profile specific to a riding scenario of the bicycle, or a profile specific to the particular rider and the riding scenario of the bicycle.

In one example, the sensor is a power meter of the bicycle, the identified sensor data includes output power data, and the respective one or more predetermined operative states for the user profile include a predetermined threshold output power. The comparison of the identified sensor data to the respective one or more predetermined operative states for the user profile includes comparison of the output power data to the predetermined threshold output power. The identification of the user profile from the plurality of user profiles based on the comparison includes identification of the user profile from the plurality of user profiles when, based on the comparison, an output power of the output power data is greater than the predetermined threshold output power.

In one example, the sensor is a sensor of a seatpost system, the identified sensor data includes pressure data within the seatpost system, and the respective one or more predetermined operative states for the user profile includes a predetermined threshold pressure. The comparison of the identified sensor data to the respective one or more predetermined operative states for the user profile includes comparison of a pressure of the pressure data within the seatpost system to the predetermined threshold pressure. The identification of the user profile from the plurality of user profiles based on the comparison includes identification of the user profile from the plurality of user profiles when, based on the comparison, the pressure within the seatpost system is greater than the predetermined threshold pressure.

In one example, the controller device also includes the sensor. The sensor includes an accelerometer. The identified sensor data includes acceleration data from the accelerometer, and the respective one or more predetermined operative states for the user profile includes a predetermined threshold speed. The processor is further configured to determine a speed of the bicycle based on the acceleration data from the accelerometer. The comparison of the identified sensor data to the respective one or more predetermined operative states for the user profile includes comparison of the determined speed of the bicycle to the predetermined threshold speed. The identification of the user profile from the plurality of user profiles based on the comparison includes identification of the user profile from the plurality of user profiles when, based on the comparison, the determined speed of the bicycle is greater than the predetermined threshold speed.

In one example, the controller device is a head unit for the bicycle.

In one example, the one or more predetermined types of data include power data, heart rate data for a user of the bicycle, a gearing of the bicycle, or any combination thereof.

In one example, the identified user profile is a riding profile. The processor is further configured to identify two or more user profiles of the plurality of user profiles based on the identified bicycle. The two or more user profiles are rider profiles. The display is further configured to display two or more respective representations of the two or more rider profiles. The processor is further configured to receive a user input selecting a representation of the displayed two or more respective representations. The selected representation corresponds to a rider profile of the two or more rider profiles. The display is configured to display at least one predetermined type of data based on the selected rider profile, the processor is further configured to initiate configuration of at least one component of the bicycle based on the selected rider profile, or a combination thereof.

In one example, the riding profile is identified after the rider profile is selected.

In one example, a computer-implemented method for identifying a user profile from a plurality of user profiles associated with a bicycle includes receiving, by a processor of a head unit of the bicycle, component data from a controller device of the bicycle. The computer-implemented method also includes identifying, by the processor, the bicycle based on the received component data, identifying, by the processor, at least one user profile of a plurality of user profiles based on the identified bicycle, and displaying, by a display in communication with the processor, at least one representation corresponding to the at least one user profile, respectively. The computer-implemented method also includes receiving, by the processor, a user input. The user input identifies a representation of the displayed at least one representation. The identified representation corresponds to a first user profile of the plurality of user profiles. The computer-implemented method also includes displaying, by the display, at least one predetermined type of data based on the identified first user profile, initiating configuration of at least one component of the bicycle based on the identified first user profile, or a combination thereof. The computer-implemented method also includes receiving, by the processor, sensor data from a sensor of the bicycle, determining, by the processor, an operative state of the bicycle based on the identified sensor data, and identifying, by the processor, a second user profile from the plurality of user profiles based on the determined operative state of the bicycle. The computer-implemented method also includes displaying one or more predetermined types of data based on the identified second user profile, initiating configuration of one or more components of the bicycle based on the identified second user profile, or a combination thereof.

BRIEF DESCRIPTION OF THE DRAWINGS

Objects, features, and advantages of the present invention will become apparent upon reading the following description in conjunction with the drawing figures, in which:

FIG. 9 is an example of a chart of component datasets representing different bicycle systems, respectively;

FIG. 12 is an example of a chart of user profiles corresponding to the different bicycle systems of FIG. 9.

Other aspects and advantages of the embodiments disclosed herein will become apparent upon consideration of the following detailed description, wherein similar or identical structures have similar reference numerals.

DETAILED DESCRIPTION OF THE DISCLOSURE

Figure 1A:
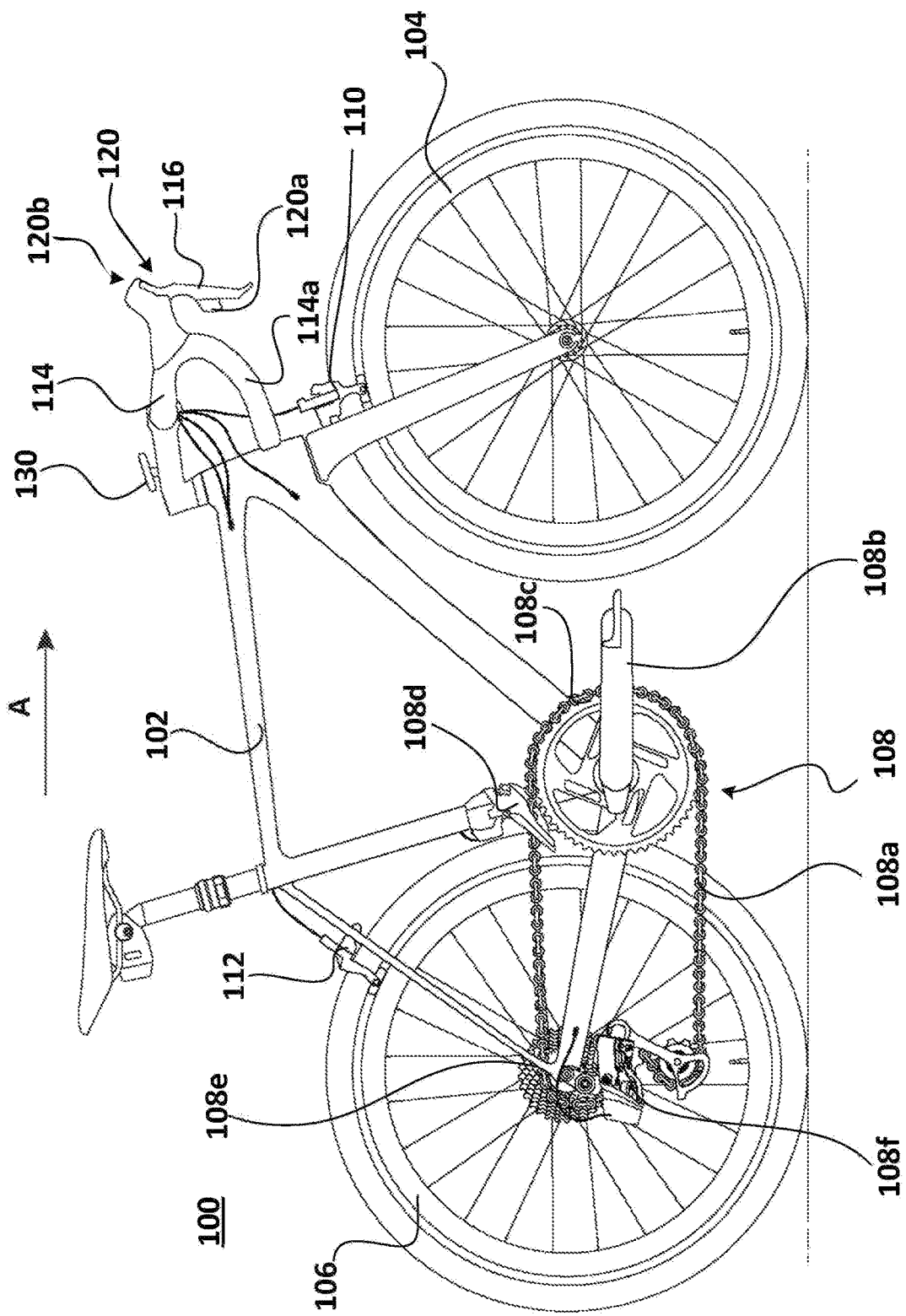
FIG. 1A is a right-side view of an example road bicycle that may implement aspects of the present disclosure.

Multiple bicycles owned and/or used by a user of a bicycle head unit, for example, may include different bicycle components (e.g., devices) and/or different sensors, respectively. When the bicycle head unit is paired into a network of one of the different bicycles (e.g., a unique bicycle), bicycle components of the unique bicycle transmit component data to the head unit via the network. The component data includes identification data (e.g., a component identification number) for at least one of the bicycle components of the unique bicycle.

The head unit compares the component data to a plurality of predetermined component datasets that represent a plurality of bicycles (e.g., a plurality of predetermined bicycle configurations that represent the plurality of bicycles), respectively. The head unit may identify the unique bicycle from the plurality of bicycles based on the comparison.

The identification of the unique bicycle from the plurality of bicycles may also be based on auxiliary data received from a source off the bicycle. For example, the auxiliary data may include location data of the unique bicycle received from a WiFi network or a global positioning system (GPS) outside of the unique bicycle. Each predetermined bicycle configuration of the plurality of predetermined bicycle configurations may include predetermined location data (e.g., for a location the respective bicycle is stored, such as a garage at a home). The head unit may compare the received location data to the predetermined location data of the plurality of predetermined bicycle configurations, and the head unit may identify the unique bicycle from the plurality of bicycles also based on this comparison.

The head unit may identify a plurality of user profiles associated with the identified unique bicycle. Each user profile of the plurality of user profiles may identify types of data to be displayed at the head unit and/or at another computing device of the bicycle, and/or settings for the bicycle components of the unique bicycle (e.g., a gear setting for a rear derailleur and/or a seat post height setting for a seat post assembly of the unique bicycle; what data to be tracked by what sensors of the unique bicycle), for example. Representations of the plurality of user profiles may be presented (e.g., displayed) to a user at the head unit and/or another computing device of the unique bicycle, and the user may select a user profile of the plurality of user profiles by selecting one of the representations. Alternatively, the head unit may identify an operative state (e.g., a speed of the unique bicycle, an acceleration of the unique bicycle, a pressure on a seat of the seat post assembly) of the unique bicycle based on, for example, sensor data from one or more sensors of the unique bicycle, and select a user profile of the plurality of user profiles based on the identified operative state of the unique bicycle.

The present embodiments provide a mechanism that allows a single head unit to automatically recognize multiple unique bicycles (e.g., auto-recognition). The auto-recognition of a unique bicycle by the head unit allows the head unit to automatically load a head unit configuration associated with the unique bicycle. Head unit auto-recognition of the unique bicycle may save time during pre-ride setup, eliminating the need to reactivate sensors and reconfigure head unit preferences for the unique bicycle. Further, once the head unit recognizes the unique bicycle, data being collected by the head unit and/or the sensors of the unique bicycle for a particular ride may be associated with the unique bicycle, such that analytics for the unique bicycle such as, for example, service interval recommendations, total ride time, and/or total elevation gain or loss may be provided.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. One or more of the components may also be paired with a separate device such as a computer (e.g., a removable head unit), tablet, or phone (e.g., a mobile computing device). This paired device may provide the user interface to allow the user to communicate with the components on the bicycle. Examples of communication are updating firmware, setting variables, and running diagnostic tools and analysis.

FIG. 1A illustrates a right side view of an example road bicycle 100. The bicycle 100 includes a frame 102, a front wheel 104, a rear wheel 106, and a drivetrain 108. The front wheel 104 and the rear wheel 106 are rotatably coupled to the frame 102. The bicycle 100 includes a front brake 110 for braking the front wheel 104 and a rear brake 112 for braking the rear wheel 106. To allow a user to steer the bicycle 100, the bicycle 100 includes a handlebar assembly 114 attached to the frame 102.

Figure 1B:
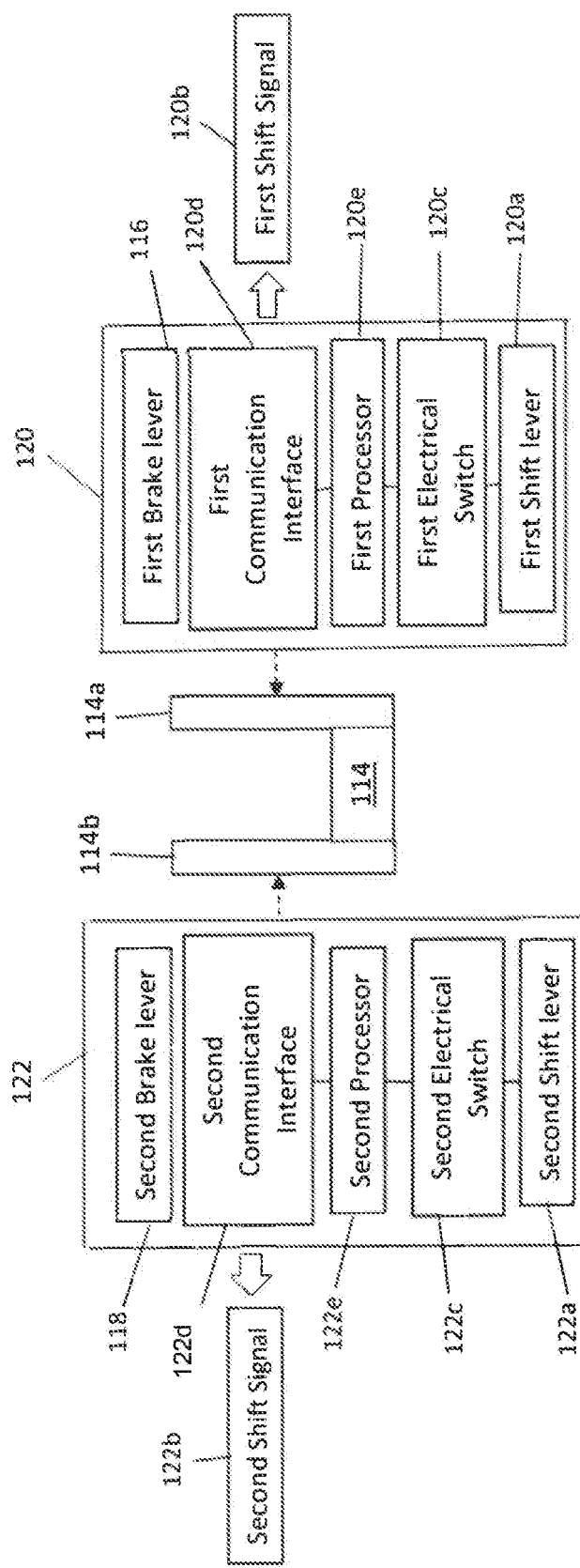
FIG. 1B is a schematic diagram of a handlebar assembly of the example road bicycle shown in FIG. 1A, and other components coupled to the handlebar assembly.

FIG. 1B illustrates a schematic diagram depicting the handlebar assembly 114 and other components coupled to the handlebar assembly 114. As shown in FIG. 1A and/or FIG. 1B, the handlebar assembly 114 includes a right drop bar 114a and a left drop bar 114b to accommodate the right hand and the left hand of the user, respectively. The bicycle 100 includes a first or right controller device 120 coupled to the right drop bar 114a. The first controller device 120 includes a first or right brake lever 116 to allow the user to operate the rear brake 112. Correspondingly, the bicycle 100 includes a second or left controller device 122 coupled to the left drop bar 114b. The second controller device 122 includes a second or left brake lever 118 to allow the user to operate the front brake 110.

Figure 1C:
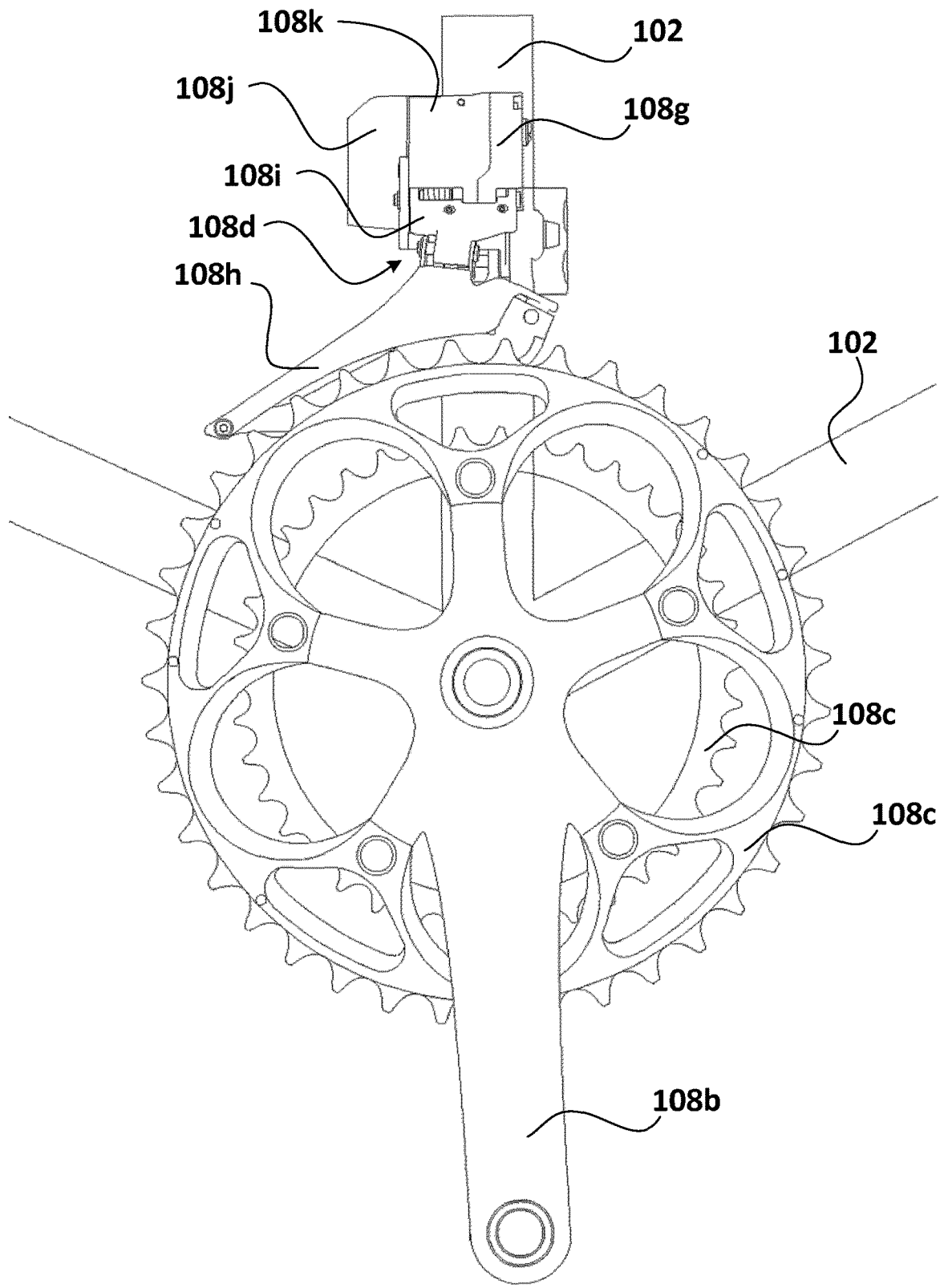
FIG. 1C is a side view of a front derailleur of an example road bicycle.
Figure 1D:
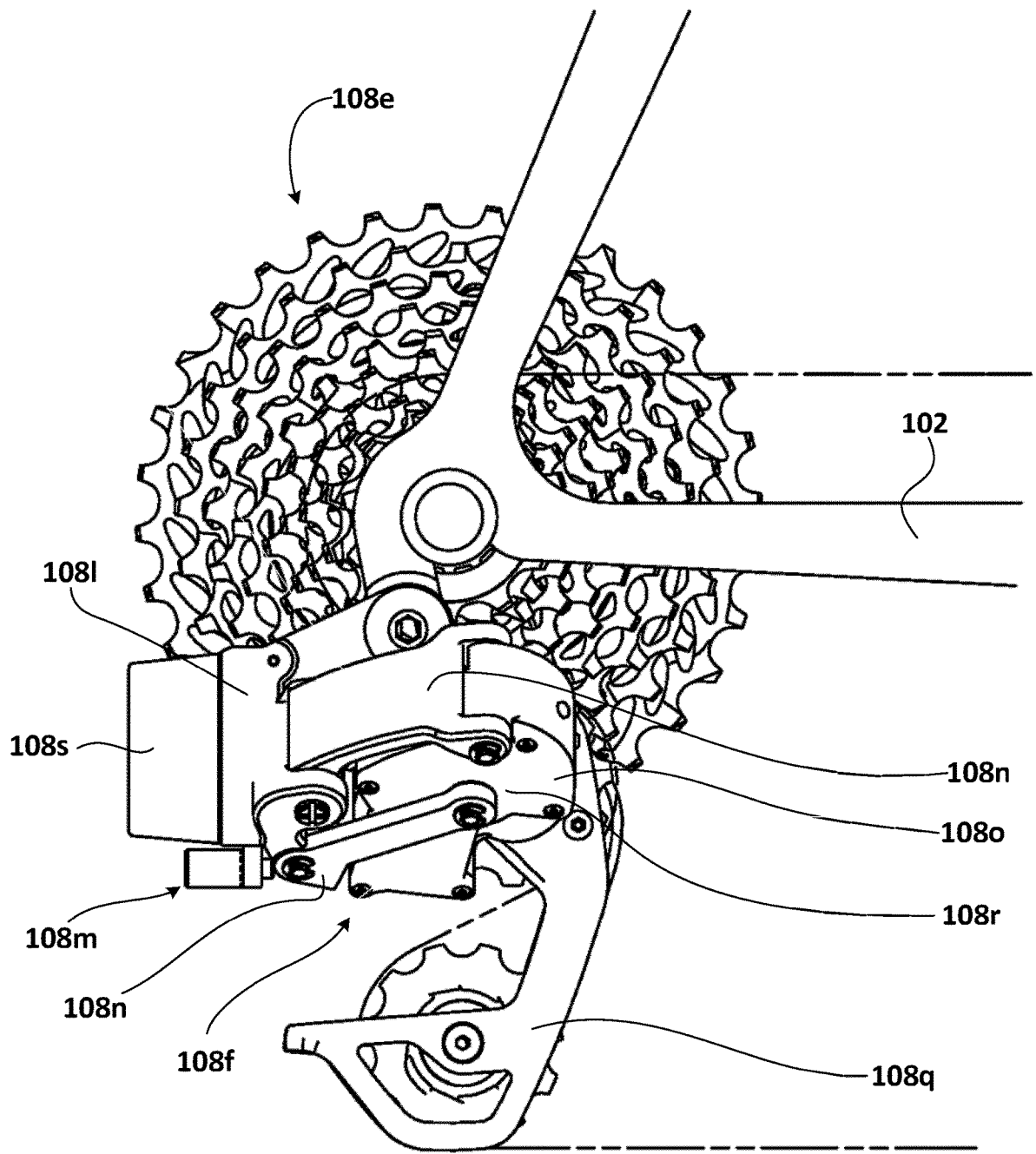
FIG. 1D is a side view of a rear derailleur of the example road bicycle shown in FIG. 1.

As shown in FIGS. 1A, 1C, and 1D, the drivetrain 108 includes a drive chain 108a, a front crank 108b, one or more front chainrings 108c, a front gear changer such as an electromechanical front derailleur 108d, rear sprockets 108e, and a rear gear changer such as an electromechanical rear derailleur 108f. The front chainrings 108c are coupled to the front crank 108b. Diameters and numbers of teeth on the front sprockets 108c may differ from each other. The rear sprockets 108e are coaxially mounted to the rear wheel 106. Diameters and numbers of teeth on the rear sprockets 108e may decrease from left to right. Alternatively, the diameters and the numbers of teeth on the rear sprockets 108e may decrease from right to left. The chain 108a engages a selected chainring 108c and a selected sprocket 108e.

To drive the bicycle 100, the user may pedal to rotate the front crank 108b relative to the frame 102. Rotation of the front crank 108b causes the selected chainring 108c to rotate and the chain 108a to move through the drivetrain 108. Movement of the chain 108a causes corresponding rotation of the selected sprocket 108e and thus the rear wheel 106. Rotation of the rear wheel 106 against the ground may propel the bicycle 100 in a forward direction. The front and/or forward orientation and movement of the bicycle 100 is indicated by the direction of arrow "A." Further, other terms relating to direction may be used herein. For example, the "inboard" and "outboard," and "left" and "right" may be used. The terms "right" and "left," and "inboard" and "outboard" describe a position between parts or items and a vertical plane substantially bisecting the bicycle or a direction toward or away from the vertical plane substantially bisecting the bicycle. Moreover, terms such as "front" and "rear" referred to bicycle mechanisms conventionally mounted to the bicycle and with the bicycle oriented in the forward direction.

The selected chainring 108c and the selected sprocket 108e, in combination, determine a gear ratio for driving the bicycle 100. Operation of the front derailleur 108d allows the user to change the selected chainring 108c engaged by the chain 108a. For example, the front derailleur 108d may be actuated to shift the chain 108a left or right from one chainring 108c to the other. The front derailleur 108d is shown as a wireless electrically-actuated front derailleur mounted to the frame 102. The front derailleur 108d may include a base member 108g mounted to the bicycle frame 102 and a chain guide assembly 108h or cage movably connected to the base member 108g by a front linkage 108i in the form of a parallelogram. A front power supply 108j (e.g., a removable battery) may be mounted on the front derailleur 108d. The front power supply 108j may supply power to a front motor unit 108k. The front motor unit 108k is configured to supply torque to the components of the front derailleur 108d to move the chain guide assembly 108h relative to the front base member 108g such that the front derailleur 108d may shift the chain 108a between the front sprockets 108c.

Operation of the rear derailleur 108f allows the user to change the selected sprocket 108e engaged by the chain 108a. For example, the rear derailleur 108f may be actuated to shift the chain 108a left or right from one sprocket 108e to another. The rear derailleur 108f is shown in FIGS. 1A and 1D as a wireless electrically-actuated rear derailleur mounted to the frame 102. The rear derailleur 108f may include a base member 108l (e.g., a b-knuckle) that is mounted to the bicycle frame 102. A linkage 108m may include two links 108n that are pivotally connected to the base member 108l. A movable member 1080 (e.g., a p-knuckle) may be connected to the linkage 108m. A chain guide assembly 108q or cage may be configured to engage and maintain tension in the chain 108a and may be pivotally connected to a part of the movable member 1080.

A motor unit 108r and rear power supply 108s (e.g., a removable battery) are disposed on the rear derailleur 108f. The battery 108s supplies power to the motor unit 108r. In this embodiment, the motor unit 108r is disposed in the movable member 1080. Alternatively, the motor unit 108r may be disposed in one of the links 108n or in the base member 108l. The motor unit 108r may include a motor and a gear transmission. The motor unit 108r may be coupled with the linkage 108m to laterally move the cage 108q and thus shift the chain 108a among the rear sprockets 108e.

Figure 1E:
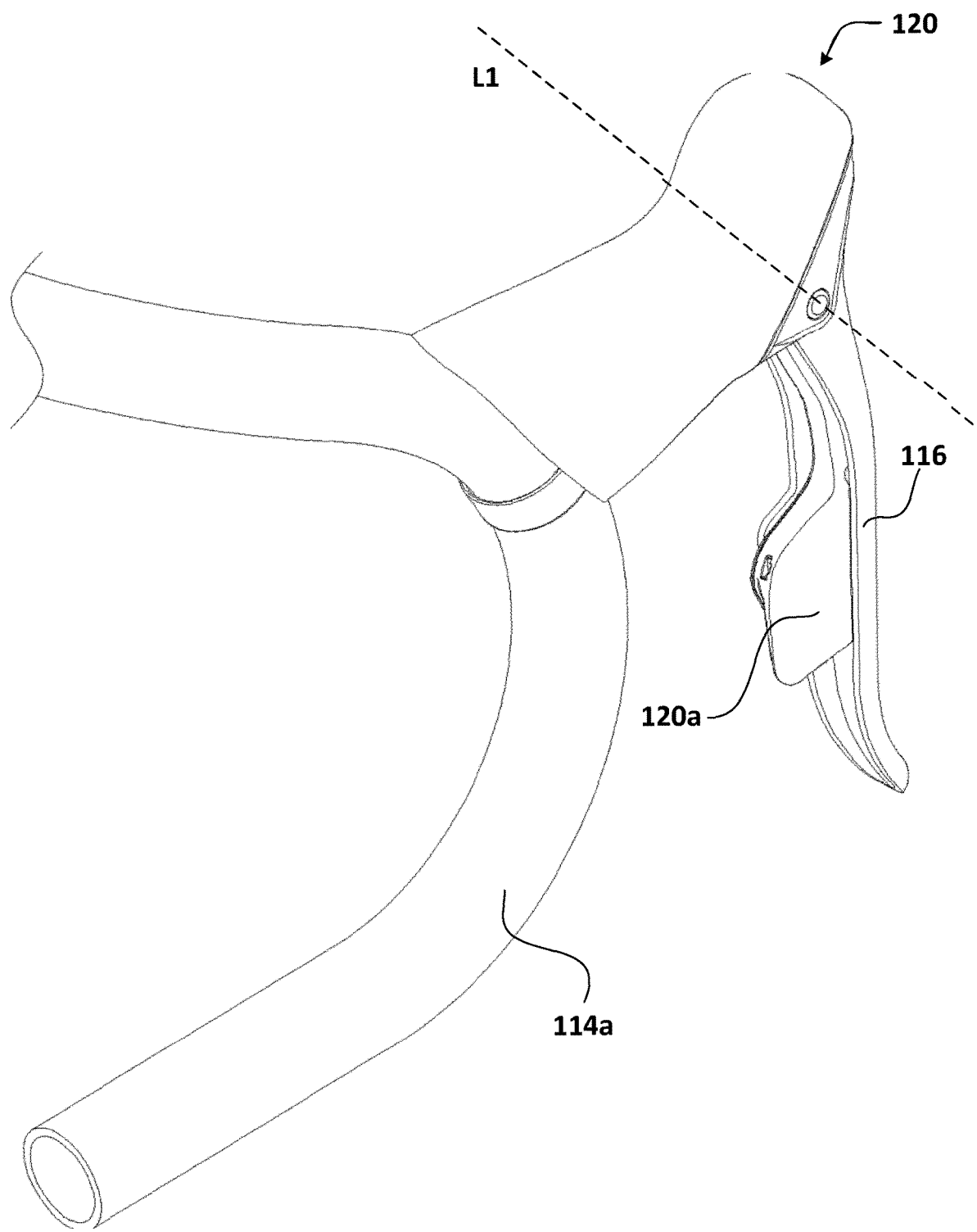
FIG. 1E is a side view of a right controller device of the example road bicycle shown in FIG. 1A coupled to a right drop bar.

Referring to FIGS. 1A, 1B, and 1E, to allow the user to operate the front derailleur 108d or the rear derailleur 108f, the first controller device 120 and the second controller device 122 include a first electrical switch 120c and a second electrical switch 122c, respectively. The first electrical switch 120c and the second electrical switch 122c are actuated by a first input element and a second input element, respectively (e.g., the first shift lever 120a and the second shift lever 122a, respectively; actuators). The first shift lever 120a is configured to receive a right input from the right hand of the user and actuate the first electrical switch 120c. The second shift lever 122a is configured to receive a left input from the left hand of the user and actuate the second electrical switch 122c. The first shift lever 120a may be positioned behind the first brake lever 116, while the second shift lever 122a may be positioned behind the second brake lever 118.

To provide the right input to the first shift lever 120a, the user may manually apply pressure on the right side of the first shift lever 120a. In response, the first shift lever 120a may pivot about a first shift lever axis L1 from an initial rest position to a shift actuation position. The first shift lever 120a may be biased with a spring or the like so that when the manual pressure is no longer applied by the user, the first shift lever 120a returns to the initial rest position. Similarly, to provide the left input to the second shift lever 122a, the user may manually apply pressure on the left side of the second shift lever 122a. In response, the second shift lever 122a may pivot about a second shift lever axis (not shown) from an initial rest position to a shift actuation position. The second shift lever 122a may be biased with a spring or the like so that when the manual pressure is no longer applied by the user, the second shift lever 122a returns to the left starting position.

The first controller device 120 and the second controller device 122 include a first controller processor 120e and a second controller processor 122e, respectively, that electronically process the manual input received by the first shift lever 120a and the second shift lever 122a, respectively. For example, the right input triggers a first controller communication interface 120d to wirelessly send a first shift signal 120b, and the left input triggers a second controller communication interface 122d to wirelessly send a second shift signal 122b. Correspondingly, the front derailleur 108d and the rear derailleur 108f include communication interfaces and processors that are configured to receive and electronically process the first shift signal 120b and/or the second shift signal 122b to determine a designated response.

As shown in FIGS. 1A and 1B, the first controller device 120 and the second controller device 122 employ the first shift lever 120a and the second shift lever 122a as respective input elements to generate corresponding wireless shift signals 120b, 122b (e.g., including messages and/or message packets) to actuate the front derailleur 108d and the rear derailleur 108f. Alternative embodiments, however, may include controller devices with different configurations to control a front derailleur and/or a rear derailleur. For example, a bicycle may include aerobars with pushbuttons instead of drop bars with shift levers, where the pushbuttons act as input elements that may be pressed by the user to generate wireless signals that may be received and processed by the front derailleur and the rear derailleur. Also, while some controller devices may be coupled to handlebar assemblies, other controller devices may be coupled to other areas of a bicycle, such as locations throughout the frame. Further, other types of controller devices are contemplated. For example, a unified shifter device may be employed, where the user may press one or more pushbuttons on a mounted box to send signals that control the front derailleur and/or the rear derailleur. Alternatively, a pedal sensor may be employed to receive input from the user via pedaling action by the user, and the front derailleur and/or the rear derailleur may respond to a signal from the pedal sensor (e.g., select gears to maintain a desired cadence or pedal resistance).

As shown in FIG. 1A, the bicycle 100 also has a user interface 130 that is handlebar mounted. The user interface 130 may be a human-machine interface (HMI) and may include one or more buttons (e.g., for pairing), sensors, a display, a sound generator, one or more processors, memory, one or more communication interfaces (e.g., a first wireless communication interface and a second wireless communication interface), and/or other components. The user interface 130 may include more, fewer, and/or different components. In one embodiment, the user interface 130 is a head unit. For example, the user interface 130 is a removable head unit that may be installed on a plurality of bicycle, including the bicycle 100.

Figure 2A:
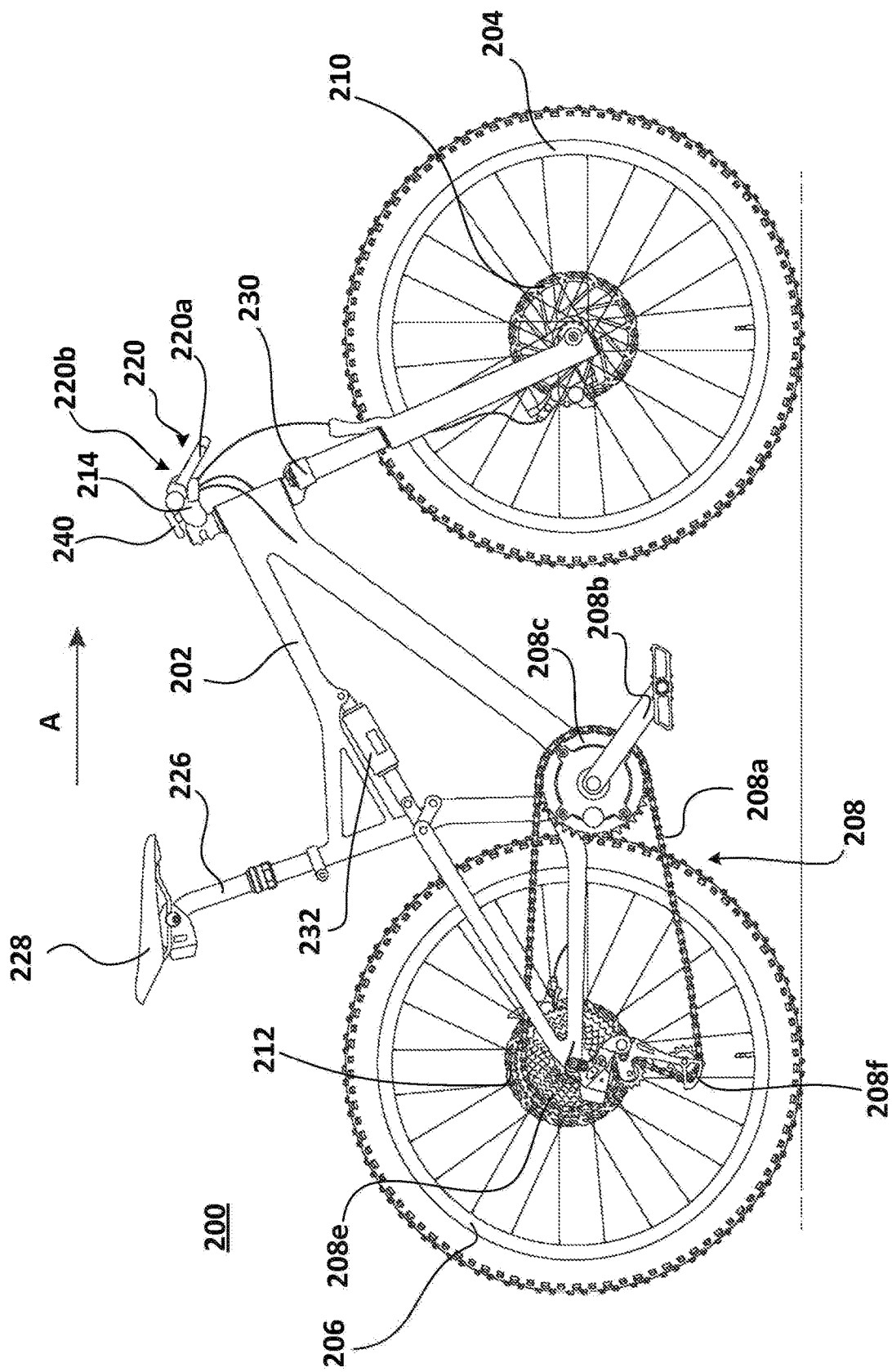
FIG. 2A is a right-side view of an example mountain bicycle that may implement aspects of the present disclosure.

While the example bicycle 100 shown in FIGS. 1A and 1B is a road bicycle, aspects of the present disclosure may be implemented with bicycles of any type. For example, FIG. 2A illustrates a right side view of an example mountain bicycle 200. In some cases, the bicycle 200 may be an e-bike. The bicycle 200 includes a frame 202, a front wheel 204, a rear wheel 206, a drivetrain 208, front disk brakes 210, and rear disk brakes 212. The drivetrain 208 includes a chain 208a, a front crank 208b, a front chainring 208c, rear sprockets 208e, and a rear derailleur 208f, which operate in a manner similar to the corresponding components of the drivetrain 108 described above.

In contrast to the bicycle 100, the bicycle 200 includes other operating-enacting devices such as a height-adjustable seat post assembly 226, a front suspension system 230 (e.g., a front suspension assembly), and a rear suspension system 232 (e.g., a rear suspension assembly). In FIGS. 2A and 2C, the seat post assembly 226 is a wireless, electrically-actuated seat post assembly 226 that allows a position of a seat 228 (e.g., a saddle) to be dynamically adjusted. For example, the adjustable seat post 226 may include an operable valve (not shown) that allows the seat 228 to be dropped to a lower height during a ride to change the position of the user (e.g., a rider) relative to the frame 202 and achieve better handling. The seat post assembly 226 includes a first or lower tube 226a and a second or upper tube 226b (e.g., two tubes). The two tubes 226a, 226b are movable relative to each other to establish a height of the seat 228 relative to the frame 202. A head 226c is fixed to a top of the second tube 226b. A seat post motor unit 226d is mounted to the head 226c, and a power supply 226e (e.g., a removable battery) is attached to the motor unit 226d. The motor unit 226d may include a motor and a gear transmission. The seat post power supply 226e may supply power to the seat post motor unit 226d. The seat post motor unit 226d is configured to supply torque to the components of the seat post assembly 226 to open and close the operable valve.

The front suspension system is shown as a wireless, electrically-actuated front suspension system 230 that allows the suspension characteristics at the front wheel 204 to be dynamically adjusted. Further, the rear suspension system is shown as a wireless, electrically-actuated rear suspension system 232 that allows suspension characteristics at the rear wheel 206 to be dynamically adjusted. The front suspension system 230 and the rear suspension system 232 may further include power supplies such as batteries that supply power to a front suspension motor unit and a rear suspension motor unit, respectively. The front suspension motor unit and the rear suspension motor unit may be configured to supply torque to the components of the front suspension system 230 and the rear suspension system 232, respectively, to open and close one or more valves to change various suspension characteristics.

Figure 2B:
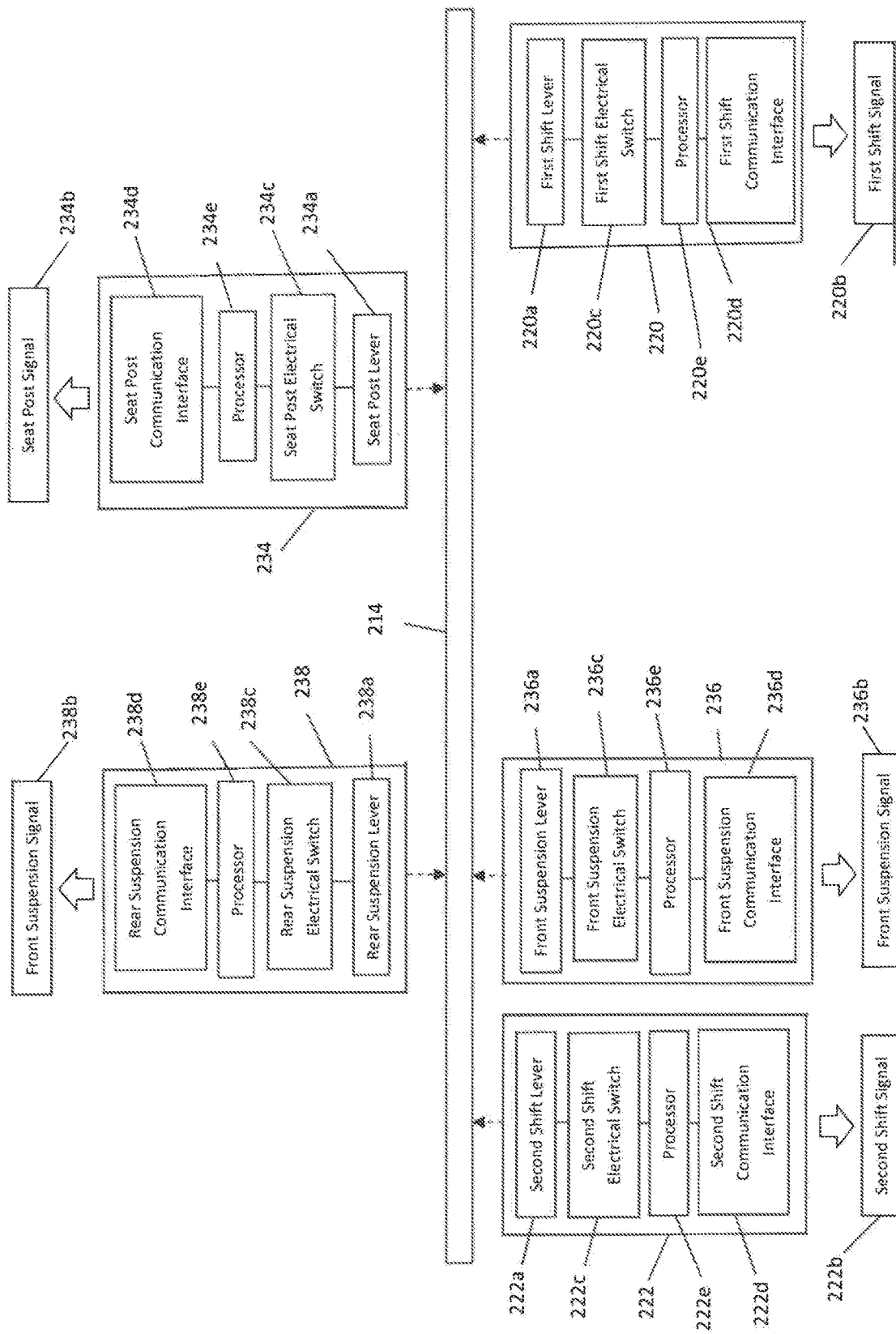
FIG. 2B is a schematic diagram of a handlebar assembly of the example mountain bicycle shown in FIG. 2A, and other components coupled to the handlebar assembly.
Figure 2C:
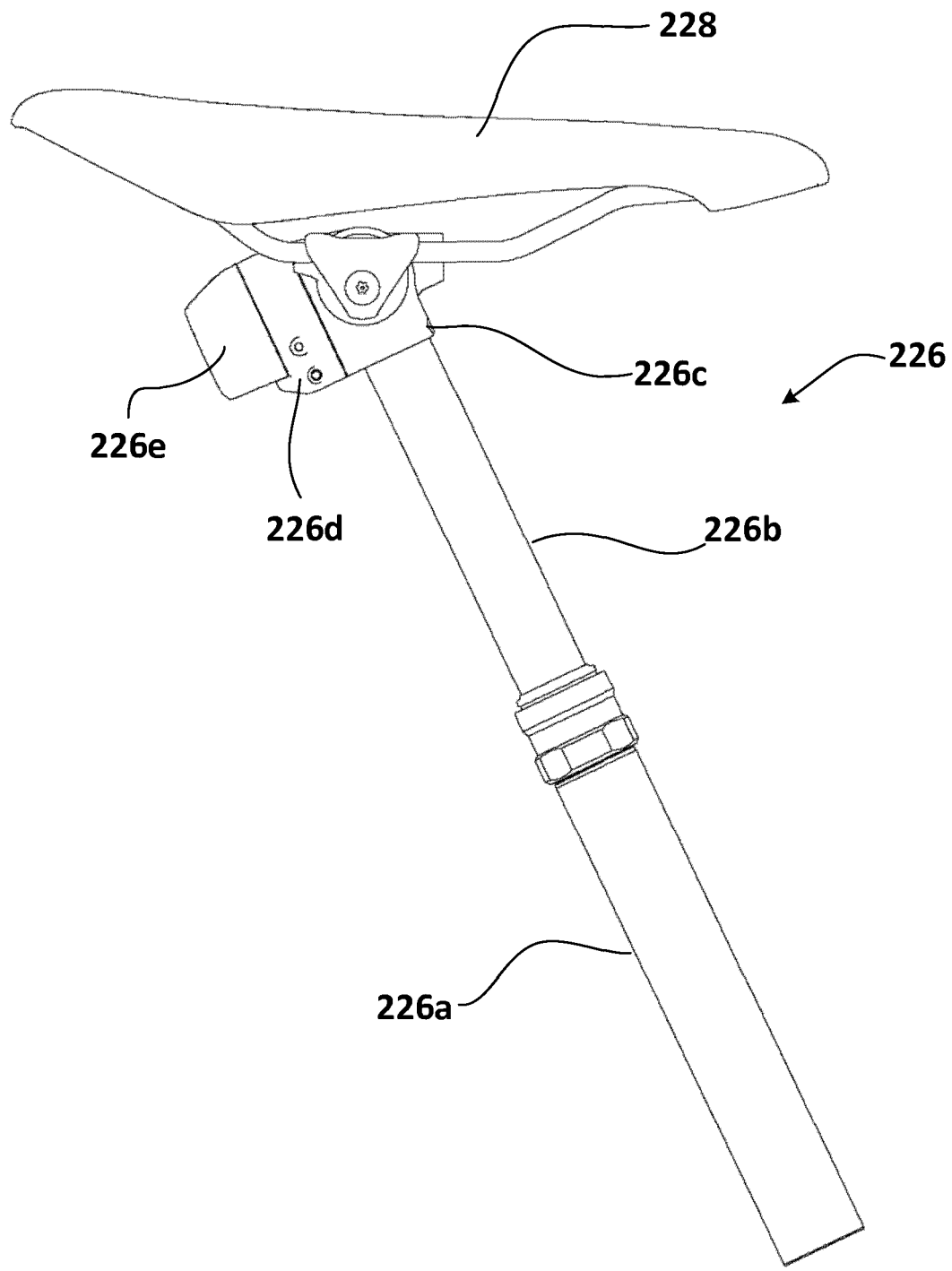
FIG. 2C is a side view of a seat post assembly, with a saddle installed thereon, of the example mountain bicycle shown in FIG. 2A.

Referring to FIGS. 2A and 2B, the bicycle 200 includes a first or right controller device 220 and a second or left controller device 222. The first controller device 220 and the second controller device 222 include a first electrical switch 220c and a second electrical switch 222c, respectively, that are actuated by a first input element and a second input element, respectively (e.g., a first shift lever or button 220a and a second shift lever or button 222a, respectively; actuators). The handlebar assembly 214 includes a flat bar or a riser bar instead of drop bars. As such, the first controller device 220 is coupled to a right side of the flat or riser bar, and the second controller device 222 is coupled to a left side of the flat or riser bar. Additionally, the bicycle 200 may include a seat post controller device 234, a front suspension controller device 236, and a rear suspension controller device 238 coupled to the handlebar assembly 214. In other embodiments, one or more of the controller devices (e.g., the first controller device 220 and the seat post controller device 234) may be formed by a single controller device (e.g., a single lever or button).

The user may operate the first shift lever 220a and/or the second shift lever 222a as described above to generate a first shift signal 220b and/or a second shift signal 222b, respectively. Similar to the bicycle 100, the first shift signal 220b and/or the second shift signal 222b may be employed to control the rear derailleur 208f. To allow the user to adjust the height of the seat post assembly 226, the seat post controller device 234 includes a seat post electrical switch 234c that is actuated by a seat post input element 234c such as a lever or button.

To allow the user to adjust the characteristics of the front suspension system 230 and the rear suspension system 232, the front suspension controller device 236 and the rear suspension controller device 238 include a front suspension electrical switch 236c and a rear suspension electrical switch 238c that are actuated by suspension input elements 236a, 238a, respectively, such as levers or buttons. Alternatively, the adjustable seat post assembly 226, the adjustable front suspension system 230, and the adjustable rear suspension system 232 may also be configured to receive the first shift signal 220b and/or the second shift signal 222b, so that these devices may also be controlled by operation of the first shift lever 220a and/or the second shift lever 222a.

The seat post controller device 234, the front suspension controller device 236, and the rear suspension controller device 238 include processors 234e, 236e 238e, respectively, that electronically process the manual input received by the seat post input element 234a, the front suspension input element 236a, and the rear suspension input element 238a, respectively. The seat post input triggers a seat post controller communication interface 234d to wirelessly send a seat post signal 234b. The front and rear suspension inputs trigger front and rear controller communication interfaces 236d, 238d, respectively, to wirelessly send a front suspension signal 236b and a rear suspension signal 238b, respectively. Correspondingly, the seat post assembly 226 includes a communication interface and a processor that is configured to receive and electrically process the seat post signal 234b to determine a designated response. The front and rear suspensions include communication interfaces and processors that are configured to receive and electronically process the front suspension signal 236b and the rear suspension signal 238b, respectively, to determine a designated response.

As shown in FIG. 2A, the bicycle 200 also has a user interface 240 that is handlebar mounted. The user interface 240 may be a human-machine interface (HMI) and may include one or more buttons (e.g., for pairing and/or selecting a user profile), sensors, a display, a sound generator, one or more processors, memory, one or more communication interfaces (e.g., a first wireless communication interface and a second wireless communication interface), and/or other components. The user interface 240 may include more, fewer, and/or different components. In one embodiment, the user interface 240 is a head unit. For example, the user interface 240 is a removable head unit that may be installed on a plurality of bicycle, including the bicycle 200.

FIGS. 1A-1E and 2A-2C illustrate how various controller devices may be employed to wirelessly communicate control signals to different combinations of operation-enacting devices. The signals from the controller devices may be communicated wirelessly using any technique, protocol, or standard. For instance, Institute of Electrical and Electronics Engineers ("IEEE") 802.11 standards, IEEE 802.15.1 or BLUETOOTH® standards, and/or ANT™ or ANT+™ standards may be used. In some embodiments, however, control signals may be communicated wirelessly over a proprietary protocol, such as one that operates on top of the physical layer of the IEEE 802.15.4 wireless protocol.

Figure 3:
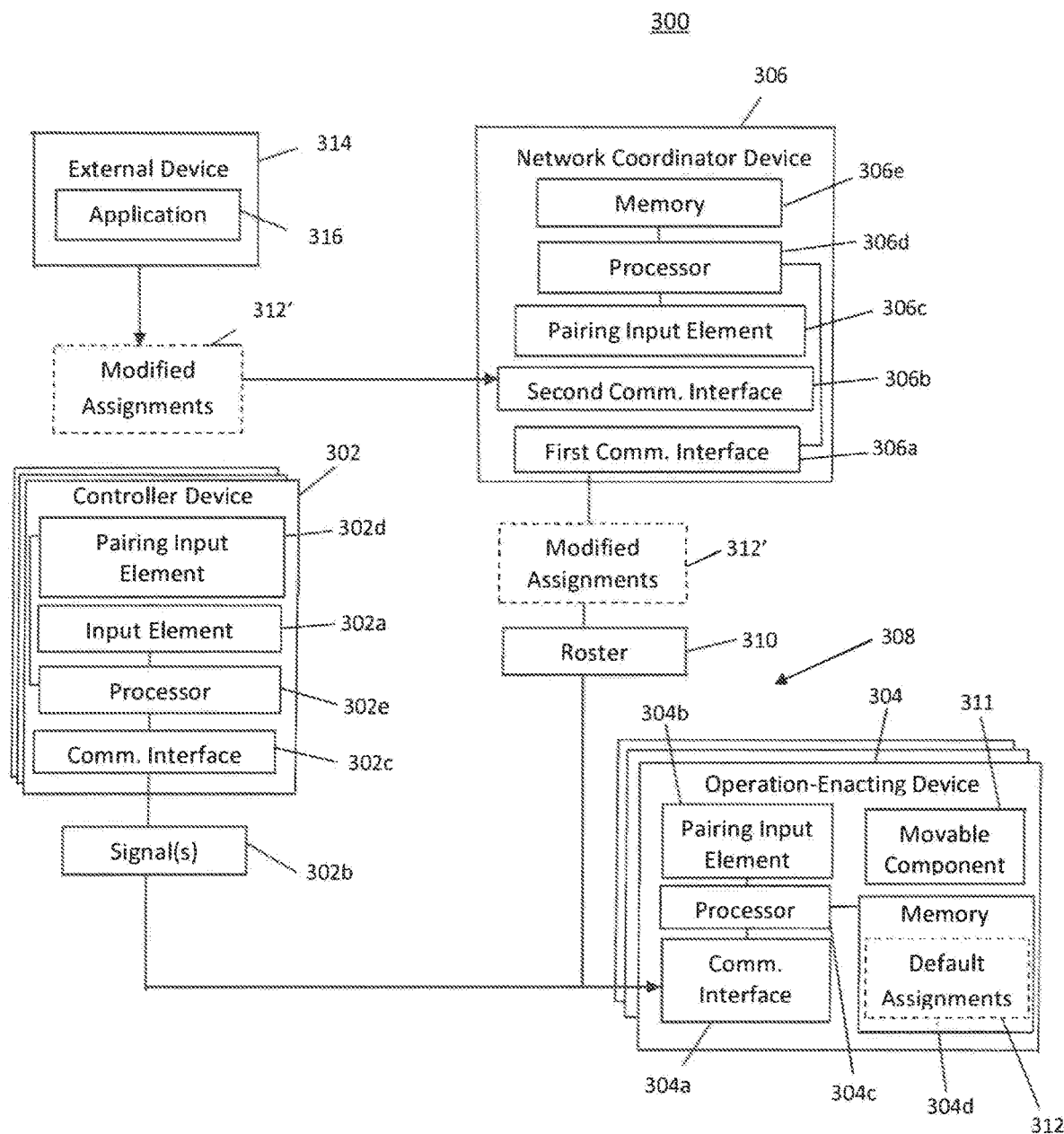
FIG. 3 illustrates an example system for controlling different combinations of operation-enacting devices on a bicycle, according to aspects of the present disclosure.

FIG. 3 illustrates an example system 300 for controlling different combinations of operation-enacting devices on a bicycle. The system 300 includes a plurality of controller devices 302. Each controller device 302 includes at least one respective input element 302a configured to receive input from a user. For example, as described above, the controller devices 302 may include a right controller device and a left controller device coupled to a handlebar assembly, where respective shifter levers act as input elements 302a. In general, input elements 302a may include any variety of shifter, pushbutton, clicker, switch, other toggled device, sensor (e.g., peddling sensor, etc.), or the like. A single controller device 302 may also include more than one input element 302a (e.g., two shifter levers, a plurality of pushbuttons, etc.). In one embodiment, at least some controller devices of the plurality of controller devices 302 do not include an input element.

Each controller device of the plurality of controller devices 302 may include one or more additional components. For example, a respective controller device 302 may include a processor 302e, a communications interface 302c, and/or a memory. The plurality of controller devices 302 are configured to transmit to, for example, a plurality of operation-enacting devices 304, signals 302b (e.g., data streams including messages and/or message packets) indicating input received by the input elements 302a of the controller devices 302. For example, the first controller device 120 and the second controller device 122 may wirelessly transmit a first shift signal 120b and a second shift signal 120a as described above to indicate input received by the first shift lever 120a and the second shift lever 122a, respectively. The communications interface 302c may be or include any number of different types of transmitters. For example, the communications interface 302c may be or include a combined transmitter and receiver.

The system 300 also includes the plurality of operation-enacting devices 304, where each operation-enacting device 304 is configured to enact at least one respective operation on the bicycle. For example, the operation-enacting devices 304 may include a front derailleur, a rear derailleur, a height-adjustable seat post assembly, a front suspension system, and/or a rear suspension system, as described above. Each operation-enacting device 304 may include at least one movable component 311 configured to modify an operative state of the bicycle. Each operation-enacting device of the plurality of operation-enacting devices 304 includes a processor 304c and may include a memory 304d. At least some operation-enacting devices 304 of the plurality of operation-enacting devices 304 may be or include controller devices 302, respectively.

In some cases, an operation-enacting device 304 may act on more than one component of the bicycle in a single operation. In other cases, a single operation may include more than one act on one or more components of the bicycle. In yet other cases, the operation may include a physical action and a wireless action, where the wireless action sends wireless signals to cause further action by other cooperative device(s).

The system 300 also includes a network coordinator device 306. The network coordinator device 306 includes a first communication interface 306a configured to communicate wirelessly with the controller devices 302 and the plurality of operation-enacting devices 304. Using the first communication interface 306a, the network coordinator device 306 may establish a wireless network 308 that enables communications between the network coordinator device 306, the controller devices 302, and the plurality of operation-enacting devices 304. Correspondingly, each controller device 302 includes a communication interface 302c and each operation-enacting device 304 includes a communication interface 304a for communicating with other devices (e.g., receiving and transmitting data/signals) on the wireless network 308. Each of the communication interfaces 304 may be or include any number of different types of receivers. In one embodiment, each of the communication interfaces 304 is or includes a combined transmitter and receiver. The network coordinator device 306 further includes a processor 306d and may include a memory 306e.

In the embodiment shown in FIG. 3, the network coordinator device 306 further includes a second communication interface 306b configured to communicate wirelessly with an external computing device 314. The external computing device 314 may be, for example, a modem, a router, or a satellite, from which the network coordinate device 306 may receive location data. Using the second communication interface 306b, the network coordinator device 306 may establish a wireless network 308 that enables communications between the network coordinator device 306 and the external computing device 314. The wireless network 308 may be any number of different types of wireless networks including, for example, a WiFi network or a global positioning system (GPS) network.

In other embodiments, the second communication interface 306b may be configured to communicate wirelessly with other external computing devices 314. For example, the other external computing devices 314 may include a smart phone, a computing tablet, a laptop, a personal computer, or the like. In one embodiment, the external computing device 314 includes an application 316, such as a mobile application, or other computer software.

The network coordinator device 306 may be any number of different types of computing devices including, for example, a head unit (e.g., the head unit 130 or the head unit 240). Although the network coordinator device 306 may appear in FIG. 3 as a separate device, the features of a network coordinator device 306 in alternative embodiments may be provided by one or more of the other controller devices 302 and/or operation-enacting devices 304 such as a rear derailleur.

The processors 302e, 304c, 306d, for example, of the system 300 may include a general processor, digital signal processor, an application specific integrated circuit (ASIC), field programmable gate array (FPGA), analog circuit, digital circuit, combinations thereof, or other now known or later developed processor. The each of processors 302e, 304c, 306d may be a single device or combinations of devices, such as through shared or parallel processing.

The memory 304d, 306e, for example, of the system 300 may be any number of different types of memory. For example, such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding, or carrying a set of instructions for execution by a processor or that cause a computer system to perform any one or more of the methods or operations disclosed herein.

To power wireless communications and computer processing, the system 300 may include power supplies, which may be stored internal to the operating device or stored external to the operating device. The power supplies may include a combination of multiple batteries or other power providing devices. Specially fitted or configured battery types, or standard battery types such as CR 2012, CR 2016, and/or CR 2032 may be used. In some embodiments, the devices in a system are all individually powered (e.g., by a dedicated battery).

As described above, the embodiments employ communication interfaces (e.g., communication interfaces 302c, 304a, 306a, and 306b). Such communication interfaces are configured to send data such as identification data, sensor data, control signals, and/or commands to bicycle components.

The communication interfaces provide for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustration or other representation of devices, such as the network coordinator devices 306, the controller devices 302, and the operation-enacting devices 304, include (even if not expressly labeled) any combination of processor(s), memory device(s) (e.g., computer-readable media storing program instructions for execution by processor(s)), sensor(s), communication interface(s), and power supply necessary to achieve the disclosed features.

At least some controller devices 302 of the plurality of controller devices 302, at least some operation-enacting devices of the plurality of operation-enacting device 304, and the network coordinator device 306 are paired into the wireless network 308, and a roster 310 is defined by the controller devices 302 and the operation-enacting devices 304 that have been paired to the wireless network 308 at the end of a pairing session.

In one embodiment, at least some controller devices 302 of the plurality of controller devices 302 and at least some operation-enacting devices of the plurality of operation-enacting device 304 are already paired into the wireless network 308, and the network coordinator device 306 (e.g., the head unit 130 or the head unit 240) is added (e.g., paired into the wireless network 308) at a later time (e.g., when the head unit 130 or the head unit 240 is attached to the bicycle 100 or the bicycle 200, respectively). In another embodiment, at least some controller devices 302 of the plurality of controller devices 302, at least some operation-enacting devices of the plurality of operation-enacting devices 304, and the network coordinator device 306 are already paired into the wireless network 306, and a head unit (e.g., the head unit 130 or the head unit 240) not acting as a network coordinator device is added (e.g., paired into the wireless network 306) at a later time (e.g., when the head unit 130 or the head unit 240 is attached to the bicycle 100 or the bicycle 200, respectively).

By fixing the roster 310, the system 300 only includes the devices 302, 304 selected by the user and/or automatically paired into the system 300. The controller devices 302, the operation-enacting devices 304, and the network coordinator device 306 may be paired into the wireless network 308 using pairing input elements 302d, pairing input elements 304b, and pairing input element 306c, respectively. The pairing input elements 302d may be the same as or different than the input elements 302a of the controller devices 302, respectively. In one embodiment, the controller devices 302, the operation-enacting devices 304, and the network coordinator device 306 are paired into the wireless network 308 without interaction with any input element. Instead, the controller devices 302, the operation-enacting devices 304, and the network coordinator device 306 are automatically paired into the wireless network 308.

When the pairing session ends, the network coordinator device 306 is configured to transmit, to the operation-enacting devices 304, the roster 310 identifying the controller devices 302 and the operation-enacting devices 304 paired to the wireless network 308. The operation-enacting devices 304 are configured to determine, based on the roster 310 received from the network coordinator device 306, how to enact operations in response to the signals 302b received from the controller devices 302.

The operation-enacting devices 304 are configured to process a default set of assignments 312 based on the roster 310 to determine how the operation-enacting devices 304 enact the operations responsive to the signals 302b. The default set of assignments 312 may be transmitted to each operation-enacting device 304 by the network coordinator device 306, and/or stored locally on each operation-enacting device 304.

For example, after a pairing session is completed, the roster 310 may include a right controller device with a right shift lever, a left controller device with a left shift lever, a front derailleur, and a rear derailleur. The default set of assignments 312 controlling the operation of the operation-enacting devices 304 is determined according to the particular set of devices in the roster 310. Modified assignments 312' may be defined by the external computing device 314 and transmitted to, for example, the network coordinator device 306.

Figure 4:
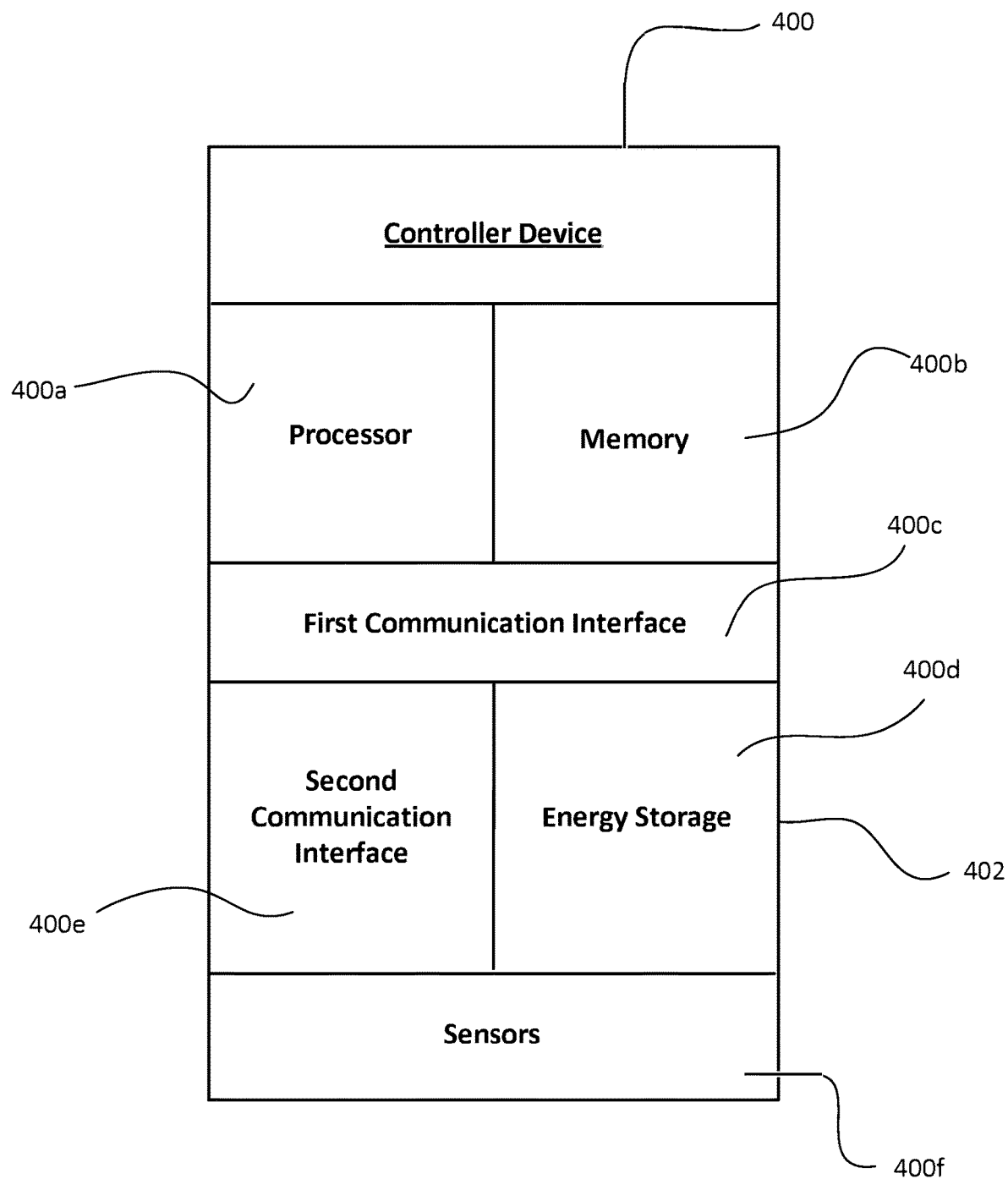
FIG. 4 illustrates an example controller device, according to aspects of the present disclosure.

FIG. 4 illustrates another embodiment of a controller device 400. The controller device 400 may be a controller device of the plurality of controller devices 302, an operation-enacting device of the plurality of operation-enacting devices 304, the network coordinator device 306, or the head unit (e.g., the head unit 130 or the head unit 240).

The controller device 400 includes, for example, a processor 400a, a memory 400b, and a first communication interface 400c. The processor 400a, the memory 400b, and the first communication interface 400c may be supported by and in communication with each other via, for example, a printed circuit board (PCB). The PCB may be supported by a housing 402.

The processor 400a may include a general processor, digital signal processor, an application specific integrated circuit (ASIC), field programmable gate array (FPGA), analog circuit, digital circuit, combinations thereof, or other now known or later developed processor. The processor 400a may be a single device or combinations of devices, such as through shared or parallel processing.

The memory 400b may be any number of different types of memory. For example, such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding or carrying a set of instructions for execution by a processor or that cause a computer system to perform any one or more of the methods or operations disclosed herein.

The first communication interface 400c provides for wireless communications in any now known or later developed format. Although the present specification describes components and functions that may be implemented in particular embodiments with reference to particular standards and protocols, the invention is not limited to such standards and protocols. In one embodiment, the controller device 400 includes a second communication interface 400e configured to communicate using a different standard or protocol compared to the first communication interface 400c.

The controller device 400 may include one or more additional components supported by the housing 402 and in communication with the processor 400a, the memory 400b, the first communication interface 400c, and/or the second communication interface 400e via the PCB. For example, the controller device 400 may also include an energy storage device 400d (e.g., power supply), one or more sensors 400f, and/or power management electronics.

The energy storage device 400d may include one or more batteries or other power providing devices. Specially fitted or configured battery types, or standard battery types such as CR 2012, CR 2016, and/or CR 2032 may be used.

The one or more sensors 400f may include any number of different types of sensors. For example, the one or more sensors 400f may include a velocity sensor, an acceleration sensor (e.g., an accelerometer), and/or a pressure sensor.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. Next, one or more of the components may be paired with a separate device like a computer, tablet, or phone. This paired device may provide the user interface to allow the user to communicate with the components on the bicycle 0. Examples of communication are updating firmware, setting variables, and running diagnostic tools and analysis.

Figure 5:
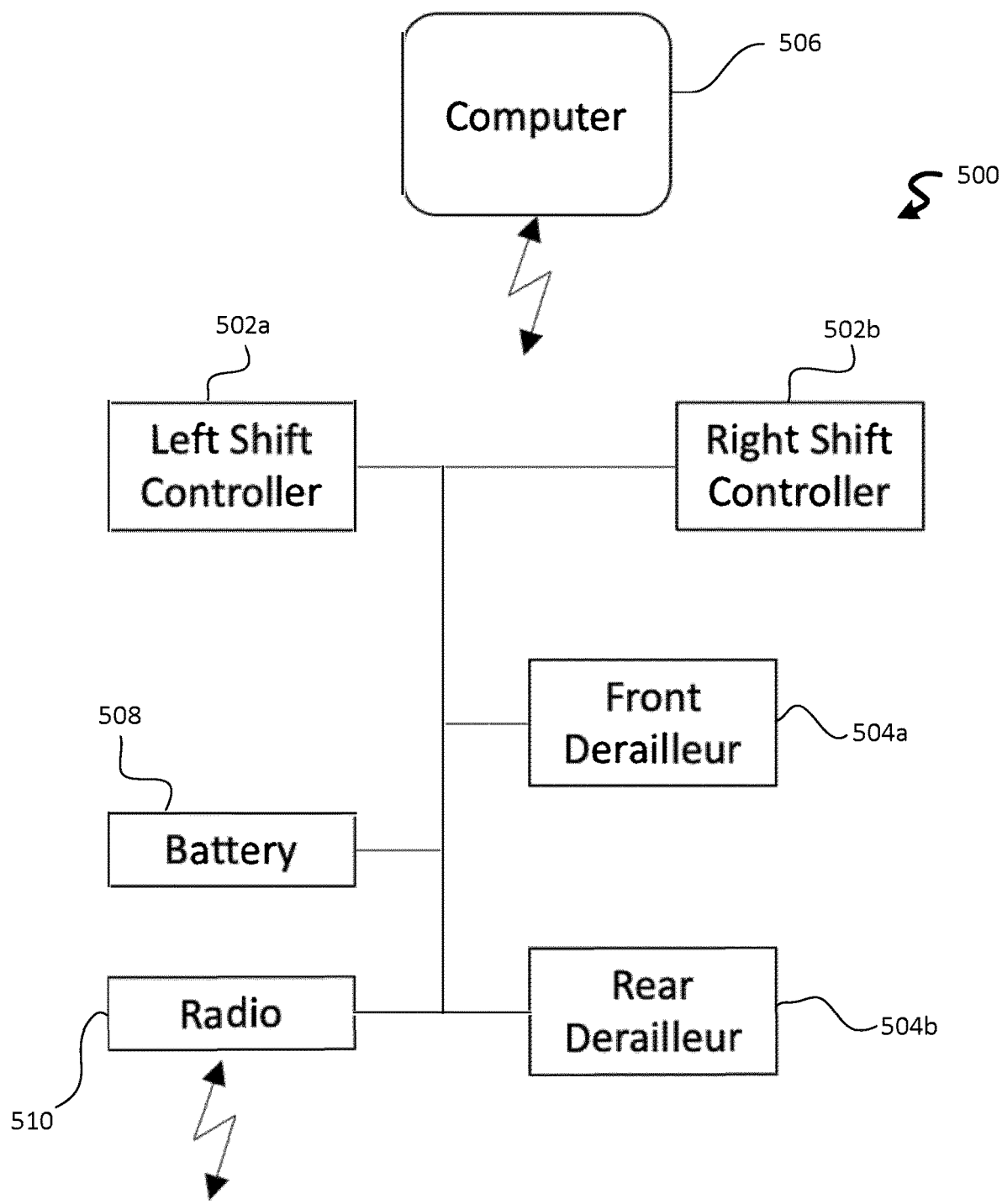
FIG. 5 illustrates an example system for controlling a first combination of operation-enacting devices on a bicycle, according to aspects of the present disclosure.

FIG. 5 shows an example of a system 500 for controlling a combination of operation-enacting devices on a bicycle. The system includes a first controller device 502a (e.g., a left shift controller; a first controller device 302) and a second controller device 502b (e.g., a right shift controller; a second controller device 302). The system 500 also includes a plurality of operation-enacting devices 504. For example, the plurality of operation-enacting devices 504 includes a front derailleur 504a and a rear derailleur 504b.

The system 500 also includes a computing device 506 (e.g., a head unit; a network coordinator device 306) that is in communication with the first controller device 502a, the second controller device 502b, the front derailleur 504a, and the rear derailleur 504b. For example, the computing device 506 includes one or more communication interfaces (e.g., including a first wireless communication interface) via which the computing device 506 may wirelessly communicate with at least one of the other components of the system 500.

The system 500 may include more, fewer, and/or additional components. For example, the system 500 may include a power source 508 (e.g., a battery) and an antenna 510 (e.g., a radio). The power source 508 and/or the antenna 510 may be part of one of the other components of the system 500 (e.g., part of the rear derailleur 504b) or may be separate from the other components of the system 500. In the embodiment shown in FIG. 5, the system 500 includes the antenna 510, and the computing device 506 communicates with the other components of the system 500 via the antenna 510.

In the embodiment shown in FIG. 5, the first controller device 502a, the second controller device 502b, the front derailleur 504a, the rear derailleur 504b, the battery 508, and the antenna 510 are in communication with each other via wired connections, and these wired components are in wireless communication with the computing device 506 via the antenna 510. Other configurations may be provided.

Figure 6:
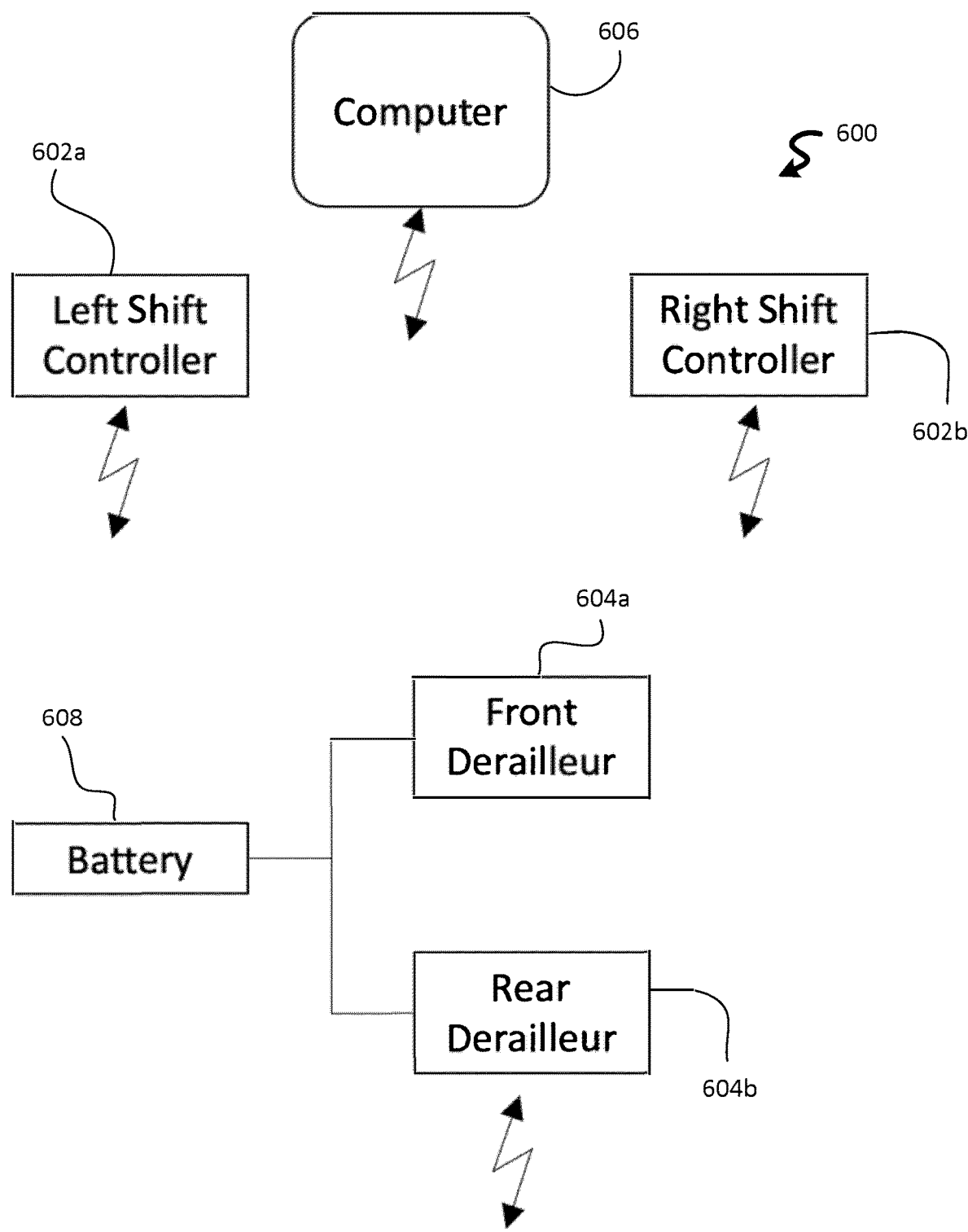
FIG. 6 illustrates an example system for controlling a second combination of operation-enacting devices on a bicycle, according to aspects of the present disclosure.

For example, FIG. 6 shows another example of a system 600 for controlling a combination of operation-enacting devices on a bicycle. The system 600 includes a first controller device 602a (e.g., a left shift controller; a first controller device 302) and a second controller device 602b (e.g., a right shift controller; a second controller device 302). The system 600 also includes a plurality of operation-enacting devices 604. For example, the plurality of operation-enacting devices 604 includes a front derailleur 604a and a rear derailleur 604b.

The system 600 also includes a computing device 606 (e.g., a head unit; a network coordinator device 306) that is in communication (e.g., direct communication) with the first controller device 602a, the second controller device 602b, and the rear derailleur 604b. For example, the computing device 606 includes one or more communication interfaces (e.g., including a first wireless communication interface) via which the computing device 606 may wirelessly communicate with at least one of the other components of the system 600. The system 600 may include more, fewer, and/or different components. For example, the system 600 may also include a battery 608.

In the embodiment shown in FIG. 6, the rear derailleur 604b, for example, may include an antenna. The front derailleur 604a, the rear derailleur 604b, and the battery 608 are in communication with each other via wired connections, and these wired components are in wireless communication with, for example, at least the computing device 606 via the antenna of the rear derailleur 604b. Other configurations may be provided. For example, the wired components may also be in wireless communication with the first controller device 602a and the second controller device 602b via the antenna of the rear derailleur 604b.

Figure 7:
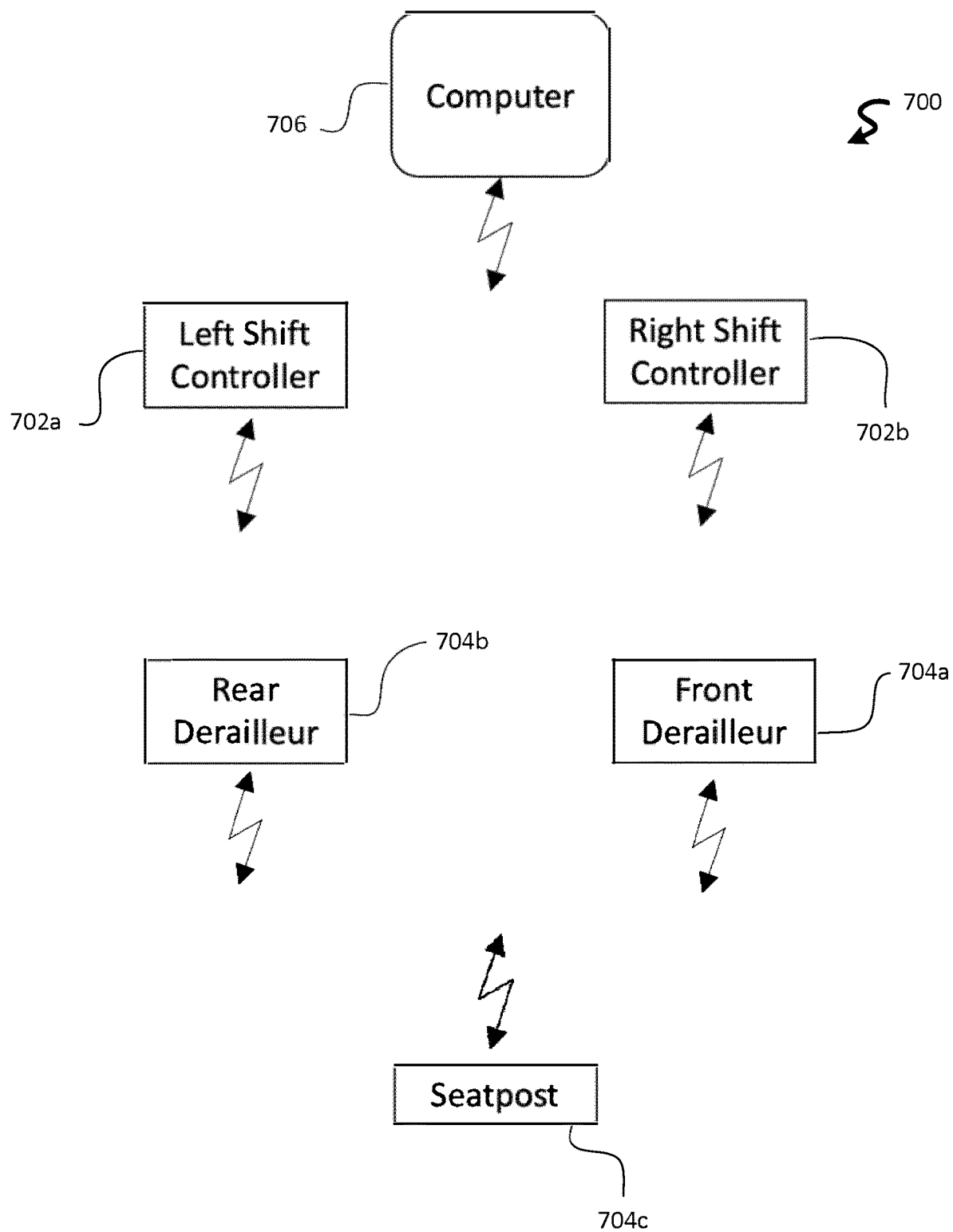
FIG. 7 illustrates an example system for controlling a third combination of operation-enacting devices on a bicycle, according to aspects of the present disclosure.

As another example, FIG. 7 shows yet another example of a system 700 for controlling a combination of operation-enacting devices on a bicycle. The system 700 includes a first controller device 702a (e.g., a left shift controller; a first controller device 302) and a second controller device 702b (e.g., a right shift controller; a second controller device 302). The system 700 also includes a plurality of operation-enacting devices 704. For example, the plurality of operation-enacting devices 704 includes a front derailleur 704a, a rear derailleur 704b, and a seatpost assembly 704c.

The system 700 also includes a computing device 706 (e.g., a head unit; a network coordinator device 306) that is in communication (e.g., direct communication) with the first controller device 702a, the second controller device 702b, the front derailleur 704a, the rear derailleur 704b, and the seatpost assembly 704c. For example, the computing device 706 includes one or more communication interfaces (e.g., including a first wireless communication interface) via which the computing device 706 may wirelessly communicate with at least one of the other components of the system 700. For example, the first controller device 702a, the second controller device 702b, the front derailleur 704a, the rear derailleur 704b, and the seatpost assembly 704c include antennas, respectively, and the computing device 706 may communicate with the first controller device 702a, the second controller device 702b, the front derailleur 704a, the rear derailleur 704b, and the seatpost assembly 704c via the antennas, respectively, and the first wireless communication interface of the computing device 706. Other component configurations and/or communication configurations may be provided. For example, the system 700 may also include a power source (e.g., a battery) that powers, for example, the front derailleur 704a and the rear derailleur 704b via wired connections.

As illustrated in FIGS. 5-7, different bicycles owned by a user of a head unit, for example, may have different component configurations. For example, the system 500 of FIG. 5 includes a separate antenna 510, while the system 600 of FIG. 6 and the system 700 of FIG. 7 do not. Further, the first controller device 502a, the second controller device 502b, the front derailleur 504a, the rear derailleur 504b, and the battery 508 are wired components. Unlike the system 500 of FIG. 5, the system 600 of FIG. 6 includes a wireless first controller device 602a and a wireless second controller device 602b. Unlike the system 500 of FIG. 5 and the system 600 of FIG. 6, the system 700 of FIG. 7 includes the seat post assembly 704c, and the front derailleur 704a and the rear derailleur 704b are wireless. Based on these differences, the systems 500, 600, and 700 are unique and identifiable relative to each other.

Figure 8:
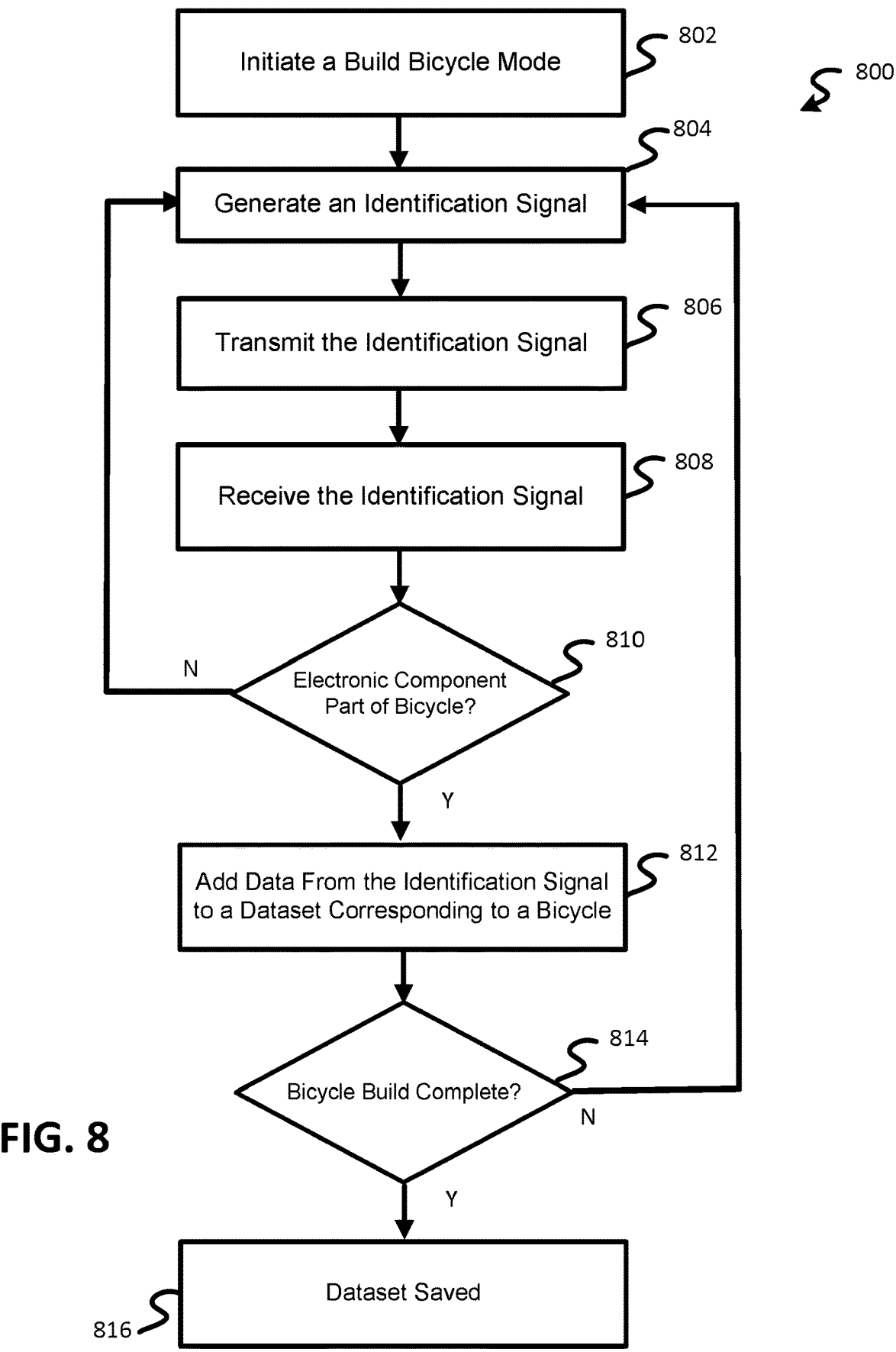
FIG. 8 is a flow chart of an embodiment of a method for generating component datasets representing different bicycle systems, respectively.

FIG. 8 illustrates a method 800 for generating component datasets representing different bicycle systems (e.g., the system 500, the system 600, and the system 700), respectively, to be used for detecting a unique bicycle, as discussed below with reference to FIG. 10. The method 800 may be executed, for example, when electronic bicycle components of a bicycle are first paired into a network of the bicycle and/or when the bicycle enters a build bicycle mode. The acts of the method 800 presented below are intended to be illustrative. In some embodiments, the method 800 may be accomplished with one or more additional acts not described, and/or without one or more of the acts discussed. Additionally, the order in which the acts of the method 800 are illustrated in FIG. 8 and described below is not intended to be limiting.

In some embodiments, the method 800 may be implemented in one or more processing devices (e.g., digital processor, an analog processor, a digital circuit designed to process information, an analog-circuit designed to process information, a state machine, and/or other mechanisms for electronically processing information). The one or more processing devices include one or more devices executing some or all the acts of the method 800 in response to instructions stored electronically on an electronic storage medium. The one or more processing devices are configured through hardware, firmware, and/or software to be specifically designed for execution of one or more of the acts of the method 800. As presented in the following, acts may be performed using any combination of the components indicated in FIGS. 1A-1E, 2A-2C, 3-7, and/or other components.

In act 802, a first processor initiates a mode (e.g., a build bicycle mode) for a bicycle. The first processor may be a processor of any number of different components (e.g., a first electronic component) of the bicycle. For example, the first processor may be a processor of a rear derailleur of the bicycle, a computing device of the bicycle (e.g., a head unit), or another electronic component of the bicycle.

The first electronic component (e.g., the head unit or the rear derailleur) may include any number of different components. For example, the first electronic component may include the first processor in communication with a communication interface (e.g., a first communication interface), a memory (e.g., a first memory), and a sensor (e.g., a first sensor) of the first electronic component. The first electronic component may include more, fewer, and/or different components.

The first processor may initiate the build bicycle mode based on user input or automatically. For example, the first processor may initiate the build bicycle mode based on one or more button presses on one or more electronic components of the bicycle (e.g., the first electronic component). Alternatively, the user may interact with the head unit (e.g., a touch screen of the head unit) or another computing device (e.g., a mobile phone) that is paired into a wireless network of the bicycle to initiate the build bicycle mode.

In one embodiment, the first processor may initiate the build bicycle mode automatically when electronic components of the bicycle are first powered on, when one or more of the electronic components are woken, when one or more of the electronic components are first paired into the wireless network or another wireless network on the bicycle, when an electronic component is added or removed from the wireless network or the other wireless network, and/or when the head unit is paired into the wireless network or the other wireless network.

In act 804, a second component (e.g., a second electronic component of the bicycle) generates a signal (e.g., an identification signal). The second electronic component of the bicycle includes a processor (e.g., a second processor) and a communication interface (e.g., a second communication interface) in communication with the processor. The second electronic component may include more and/or different components. For example, the second electronic component may include a sensor (e.g., a second sensor) and a memory (e.g., a second memory) in communication with the second processor and the communication interface of the second electronic component. The second sensor may be, for example, an accelerometer.

The second electronic component of the bicycle may be any number of different types of electronic components. For example, the second electronic component may be a derailleur (e.g., a front derailleur), a seat post assembly, a control device, or another electronic component of the bicycle.

The accelerometer of the second electronic component, for example, or another sensor of the bicycle may sense when the second electronic component moves, and the second electronic component (e.g., the second processor and/or the second communication interface) may wake based on the sensed movement. The second electronic component (e.g., the second processor) may generate the signal in response to waking.

In another embodiment, the first electronic component (e.g., the first processor) may generate and transmit a signal in response to the initiation of the build bicycle mode in act 802 (e.g., a mode signal). The second electronic component may generate the identification signal in act 804 in response to receipt of the mode signal generated and transmitted by the first electronic component.

The second electronic component of the bicycle may be in a paired state or an unpaired state (e.g., with the first electronic component of the bicycle). When in the unpaired state, the processor of the second electronic device may generate the signal periodically (e.g., once every 0.1 s, 0.01 s, or 0.001 s) for a predetermined period of time. The signal may, for example, identify the second electronic component. For example, the signal may include data representing a type of bicycle component (e.g., "front derailleur") the second electronic component is and/or an identification number (e.g., a unique identification number) corresponding to the second electronic component. The signal may include additional, less, and/or different information.

In act 806, the second electronic component transmits the signal generated in act 804. The second electronic component may transmit the signal generated in act 804 via, for example, the second communication interface. In one embodiment, in the unpaired state, the second electronic component may not transmit the signal generated in act 804 to a particular destination. In another embodiment, in the paired state, the second electronic component may transmit the signal generated in act 804 to the first electronic component.

In act 808, the first electronic component receives the signal transmitted by the second electronic component in act 806. The first electronic component receives the signal transmitted by the second electronic component via, for example, the first communication interface. When the first electronic component is in the unpaired state, the first electronic component may listen for signals and/or messages from other electronic components of the bicycle (e.g., the second electronic component) and/or off the bicycle. For example, the first processor of the first electronic component may listen for and receive, via the first communication interface, the signal transmitted by the second electronic component in act 806. The first electronic component may begin listening for the signals and/or the messages in response to the initiation of the build bicycle mode in act 802.

In act 810, the first electronic component (e.g., the first processor) determines whether the second electronic component is part of the bicycle. In one embodiment, the first electronic component may determine whether the second electronic component is part of a network of the bicycle instead of determining whether the second electronic component is part of the bicycle.

As an example, the first processor initiates generation and display (e.g., at the head unit) of a representation of the second electronic component (e.g., the bicycle component type and/or the identification number) based on the signal received in act 808, and the user confirms or rejects the second electronic component being part of the bicycle (e.g., at the head unit). As another example, the first processor initiates the generation of a visual signal (e.g., a blinking light) or an audio signal (e.g., one or more tones) at the second electronic component in response to the signal received in act 808, and the user confirms the second electronic component is part of the bicycle by, for example, pressing a button in response to the visual signal or the audio signal at the second electronic component. In other words, the first electronic component determines the second electronic component is part of the bicycle based on user input at the first electronic component, the second electronic component, the head unit, another computing device in communication with the first electronic component, and/or another component of the bicycle.

If the first processor determines the second electronic component is part of the bicycle, the method 800 moves to act 812. If the first processor determines the second electronic component is not part of the bicycle, the method 800 returns to act 804, and acts 804-810 may be repeated for one or more additional components (e.g., a third electronic component of the bicycle).

In act 812, the first processor adds data from the signal received in act 808 to a dataset corresponding to the bicycle (e.g., representing a bicycle system). For example, the dataset corresponding to the bicycle is stored in the first memory of the first electronic component, the second memory of the second electronic component, a memory of the head unit, a memory of another computing device (e.g., a mobile phone), and/or another memory (e.g., a memory within the Cloud).

When the bicycle build mode is initiated in act 802, the user may assign a name to the bicycle system (e.g., the dataset corresponding to the bicycle system) being built in the method 800. For example, the user may interact with, for example, the head unit, the first electronic component, a computing device (e.g., a mobile phone) in communication with the first electronic component, and/or another computing device to assign the name to the bicycle system. For example, referring to FIG. 9, for the first bicycle system being built within the bicycle build mode initiated in act 802, the user may assign a bicycle name of "TT road bike." In one embodiment, the first processor automatically assigns a name based on types of electronic components identified during the method 800 (e.g., road bicycle components, gravel bicycle components, or mountain bicycle components).

In act 812, the first processor, for example, may add the data from the signal received in act 808 to the dataset corresponding to the bicycle, which includes the user assigned bicycle name. The dataset corresponding to the bicycle may be stored within a table (e.g., within a row of the table or a column of the table; a first table). For example, the dataset corresponding to the "TT road bike" may be stored in a row of the table stored in the memory.

FIG. 9 also shows additional bicycle systems built within the bicycle build mode using the method 800 with the bicycle names of "gravel bike," and "mountain bike," respectively. Any number of other names may be assigned to any number of additional, fewer, and/or different bicycle systems built in the bicycle build mode.

Additionally or alternatively, the first processor, for example, may automatically assign a name to the bicycle system being built in the bicycle build mode of act 802, and the dataset corresponding to the bicycle may also include the automatically assigned name for the bicycle (e.g., stored in the row of the table stored in the memory). Referring to FIG. 9, the first processor, for example, may automatically assign a "Bike ID" based on how many different bicycle systems the user has built using the method 800 (e.g., how many datasets corresponding to different bicycle systems have been saved to the memory using the bicycle build mode initiated in the method 800). For example, the first bicycle system built by the user using the method 800 may be assigned a "Bike ID" of "bike_1," and "bike_1" may be stored with the name of the bicycle system assigned by the user (e.g., "TT road bike").

The data from the signal added, in act 812, to the dataset corresponding to the bicycle may include, for example, the bicycle component type and/or the identification number for the second electronic component. For example, referring to FIG. 9, when the second electronic component is, for example, a front derailleur, the signal transmitted by the second electronic component in act 806 and received by the first electronic component in act 808 may include identification data of "front_derailleur_659." The identification data included within the signal received by the first electronic component in act 808 may identify the type of the electronic component, a front derailleur, and may include a unique identification number, 659. Additional, less, and/or different identification data may be included within the signal received by the first electronic component in act 808.

The identification data included within the signal (e.g., corresponding to the second electronic component) received by the first electronic component in act 808 may be stored in the row of the table stored in the memory corresponding to the bicycle system currently being built with the method 800. For example, the identification data for the second electronic component, which is included in the first signal received by the first electronic component, may correspond to a "1st component ID" within the table stored in the memory.

In act 814, the first processor determines whether the current bicycle system (e.g., corresponding to the bicycle) being built in the bicycle build mode initiated in act 802 is complete. In other words, the first processor determines whether any additional data (e.g., corresponding to additional electronic components of the bicycle) is to be added to the dataset representing the bicycle stored in the table (e.g., in the row of the table). The first processor may determine whether the current bicycle system being built is complete by identifying an elapsed time since a last received signal (e.g., identification signal) and comparing the elapsed time to a predetermined time period (e.g., 5 seconds, 10 seconds, 20 seconds, or 30 seconds). The first processor determines the current bicycle system being built is complete when the elapsed time is greater than the predetermined time period. Alternatively, the first processor may identify the current bicycle system being built is complete based on user input (e.g., a button press at one of the electronic components of the bicycle, such as the first electronic component, or user input at the head unit).

When the first processor determines the current bicycle system being built is complete, the method 800 moves to act 816. In act 816, the dataset corresponding to the bicycle (e.g., corresponding to the bicycle system currently being built) is saved. As discussed above, the dataset corresponding to the bicycle may be built (e.g., saved to the table) as signals are received from electronic components of the bicycle in act 808. The dataset corresponding to the bicycle may be built within the table stored in the memory as the signals are received from the electronic components of the bicycle. In one embodiment, however, the memory stores the identification data for the electronic components of the bicycle, but the memory or another memory does not store the identification data for the electronic components of the bicycle as a corresponding dataset within the table until act 816 after the building of the current bicycle system (e.g., corresponding to the bicycle) in the bicycle build mode initiated in act 802 is complete.

In one embodiment, the identification data for the electronic components of the bicycle is collected (e.g., stored at the first memory of the first electronic component) during the bicycle build mode initiated in act 802 as the dataset corresponding to the bicycle, and the first electronic component, for example, transmits the dataset corresponding to the bicycle to a central storage location (e.g., the Cloud). A memory of the Cloud, for example, stores the table, and upon receipt of the dataset corresponding to the bicycle by the Cloud, the memory of the Cloud stores the dataset corresponding to the bicycle within the table (e.g., with a row or a column of a table).

The table may be associated with the user, and the user may enter the bicycle build mode initiated in act 802 for any number of bicycles. A row or a column of the table, for example, may be added each time the user initiates the bicycle build mode for a different bicycle.

If the first processor determines in act 814 that the current bicycle system (e.g., corresponding to the bicycle) being built is not complete (e.g., other electronic components are to be added; additional signals are being generated by other electronic components and received by the first electronic component), the acts 804-814 may be repeated for any number of other electronic components (e.g., the third electronic component, such as a rear derailleur) of the bicycle. For example, referring to FIG. 9, repeating the acts 804-814 for a rear derailleur of the bicycle, the identification data of "rear_derailleur_131" may be added to, for example, the dataset corresponding to the bicycle system currently being built (e.g., the corresponding row of the table).

In one embodiment, the acts 804-812 of the method 800 are repeated for a device off of the bicycle. For example, the first electronic component may receive auxiliary data from a device off the bicycle in repeated act 804, and acts 806-812 may be repeated for the auxiliary data. The first electronic component may include another communication interface (e.g., a third communication interface) that is different than the communication interface (e.g., the first communication interface), via which the first electronic component communicates with, for example, the second electronic component. In other words, the first electronic component may receive the auxiliary data via a communication interface of the first electronic component that is different than the communication interface, via which the first electronic component communicates with other electronic components of the bicycle.

For example, the device off the bicycle is a WiFi router, a wireless access point (e.g., a WiFi access point), or a global positioning system (GPS) satellite or server. The auxiliary data may include location data or may include data or signals, based on which a location of the first electronic component may be determined. For example, the auxiliary data may include a name of a WiFi access point communicating with the first electronic component in the method 800, a name of a WiFi network to which the first electronic component is connectable, or may include one or more GPS signals received by the first electronic component or another component of the bicycle for triangulation or trilateration of the first electronic component, for example. The auxiliary data may include more, less, and/or different location data identifying the location of the first component or based on which the location of the first component may be determined. The auxiliary data or location data determined based on the auxiliary data (e.g., a location determined based on triangulation or trilateration of the GPS signals) may be stored in a row or a column of the table, for example, as part of the dataset corresponding to the current bicycle system being built.

Figure 10:
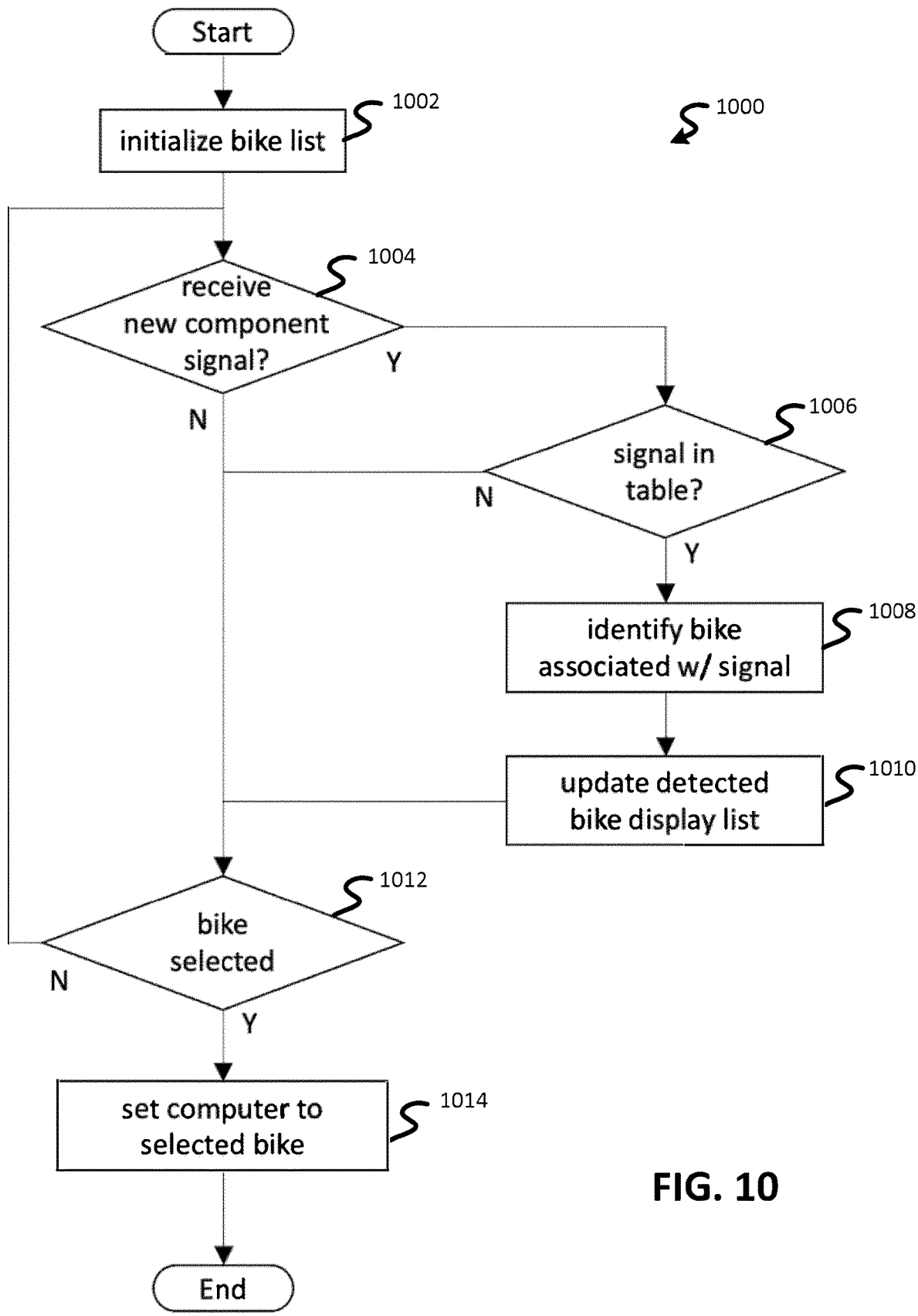
FIG. 10 is a flow chart of an embodiment of a method for detecting a unique bicycle system.

Once a plurality of bicycle systems (e.g., corresponding to a plurality of different bicycles) have been built using the method 800 of FIG. 8 or another method, and stored in the table, the table may be used, for example, in a method 1000 of FIG. 10. The table then stores, for example, predetermined component datasets for a plurality of different bicycles, respectively. A head unit may be used on the plurality of different bicycles, and the head unit may determine on which bicycle of the plurality of different bicycle the head unit is installed based on the predetermined component datasets stored in the memory.

FIG. 10 illustrates a method 1000 for detecting a unique bicycle (e.g., corresponding to the system 500, the system 600, or the system 700). The method 1000 may be executed, for example, when a head unit is first paired into a network of the bicycle, when electronic components of the bicycle are woken up (e.g., when the user shakes the bicycle and, based on sensor data identifying movement of the bicycle, the electronic components of the bicycle are woken up), once the user starts riding the bicycle (e.g., as the electronic components transmit data, including identification data, to the head unit over the course of a ride), and/or based on user input. The acts of the method 1000 presented below are intended to be illustrative. In some embodiments, the method 1000 may be accomplished with one or more additional acts not described, and/or without one or more of the acts discussed. Additionally, the order in which the acts of the method 1000 are illustrated in FIG. 10 and described below is not intended to be limiting.

In some embodiments, the method 1000 may be implemented in one or more processing devices (e.g., digital processor, an analog processor, a digital circuit designed to process information, an analog-circuit designed to process information, a state machine, and/or other mechanisms for electronically processing information). The one or more processing devices include one or more devices executing some or all the acts of the method 1000 in response to instructions stored electronically on an electronic storage medium. The one or more processing devices are configured through hardware, firmware, and/or software to be specifically designed for execution of one or more of the acts of the method 1000. As presented in the following, acts may be performed using any combination of the components indicated in FIGS. 1A-1E, 2A-2C, 3-7, and/or other components.

In act 1002, a processor (e.g., a first processor) of a first electronic component of a bicycle identifies a plurality of predetermined datasets for a plurality of bicycles, respectively. In other words, the first processor of the first electronic component of the bicycle initializes a list of bicycles (e.g., representing the plurality of bicycles). For example, the first electronic component of the bicycle identifies a table associated with a user, and the table may store the predetermined datasets for the plurality of bicycles in separate rows or columns of the table, respectively. The plurality of predetermined datasets may have been previously generated and stored using, for example, the method 800 of FIG. 8. Each predetermined dataset of the plurality of predetermined datasets includes identification data for at least one bicycle component of the respective bicycle. For example, the identification data identifies one or more unique bicycle components (e.g., a rear derailleur, a front derailleur, a first controller device, and a second controller device) for each bicycle of the plurality of bicycles. In one embodiment, at least some predetermined datasets of the plurality of predetermined datasets also include location data for the corresponding bicycles, respectively. The location data may identify, for example, storage locations for the corresponding bicycles, respectively.

The table, for example, may be stored in a memory of the first electronic component, and/or the table may be transmitted to the first electronic component from a remote memory (e.g., a memory of the Cloud). The first electronic component is, for example, a head unit, though the first electronic component may be other bicycle components. The head unit may be removable and may be installed on a bicycle of the plurality of bicycles or another bicycle (e.g., not represented in the table). The user may sign into the head unit (e.g., using a username and password), the head unit may transmit the username and the password to the Cloud, for example, and the Cloud may transmit the table to the head unit if the user associated with the username and the password, for example, matches the user associated with the table.

The head unit may include any number of components. For example, the head unit may include the first processor, a memory (e.g., a first memory), at least one communication interface, and/or one or more other components. The head unit may include more, fewer, and/or different components. For example, the head unit may include a first communication interface configured to communicate with bicycle components of the bicycle, and a second communication interface configured to communicate with a computing device off of the bicycle (e.g., the Cloud and/or a mobile computing device).

In act 1004, the head unit (e.g., the processor of the head unit) determines whether a new component signal has been received. In one embodiment, when the head unit, for example, is turned on, the processor of the head unit generates and transmits (e.g., via the first communication interface of the head unit) a signal requesting (e.g., a request signal) identification data from electronic components of the bicycle (e.g., from electronic components within a distance relative to the head unit). The head unit may be in an unpaired state with the electronic components of the bicycle and may thus transmit the request signal to no particular destination. The head unit, for example, may receive the new component signal via, for example, the first communication interface or the second communication interface of the head unit in response to the request signal transmitted by the head unit.

In other embodiments, the processor of the head unit, for example, may receive the new component signal without first transmitting the request signal. For example, each of one or more of the electronic components of the bicycle may generate and transmit a new component signal when woken and/or based on user input (e.g., a press of a button at the respective electronic component of the bicycle).

The new component signal may, for example, be from one of the electronic components of the bicycle. For example, the new component signal may include data representing a type of bicycle component (e.g., "front derailleur") the one electronic component is and/or an identification number (e.g., a unique identification number) corresponding to the one electronic component (e.g., identification data). The new component signal may include additional, less, and/or different information.

In one embodiment, the new component signal may be from a device off the bicycle. For example, the new component signal may include auxiliary data from a WiFi device (e.g., a WiFi access point or a WiFi router) or GPS satellites or servers. The new component signal may be from other devices off the bicycle. The auxiliary data may include location data or other data (e.g., GPS signals) that may be used to determine a location of the head unit, for example. In one embodiment, the auxiliary data includes a name of a WiFi access point or router, a name of a WiFi network to which the head unit, for example, is connectable (e.g., a WiFi network within range of the head unit), or GPS signals that may be used to determine location of the head unit, for example.

If the processor of the head unit determines, in act 1004, that a new component signal has been received, the method 1000 moves to act 1006. If the processor of the head unit determines, in act 1004, that a new component signal has not been received, the method 1000 moves to act 1012.

In act 1006, the head unit (e.g., the processor of the head unit) determines whether the identification data included within the new component signal received in act 1004 is included in one or more datasets of the plurality of predetermined datasets (e.g., stored in the table) identified in act 1002. For example, referring to the example of FIG. 9, the new component signal received in act 1004 may include the identification data "rear_derailleur_607," which corresponds to "bike_2," or "gravel bike," in the table.

A same electronic component may be installed on multiple bicycles associated with the user (e.g., represented in the table). For example, the user may install a same type of rear derailleur (e.g., a same model manufactured by a same company) on multiple bicycles associated with the user. In one embodiment, the identification data for each of these rear derailleurs is different (e.g., unique).

In another embodiment, the identification data is the same for each of these rear derailleurs. In other words, the same identification data is stored in the table within different datasets of the plurality of predetermined datasets representing different bicycles of the plurality of bicycles. For example, referring to FIG. 9, if the same type of rear derailleur is installed on the "bike_2," the "gravel bike," and "bike_3," the "mountain bike," the identification data for the rear derailleur received in act 1004, for example, may be "rear_derailleur_607" for both "bike 2" and "bike 3." Accordingly, a single match of identification data with a dataset of the plurality of predetermined datasets in act 1006 may not be sufficient to identify a bicycle of the plurality of bicycles.

In one embodiment, when the new component signal received in act 1004 includes auxiliary data (e.g., data related to a location of the head unit), in act 1006, the head unit may determine whether the auxiliary data is included in one or more datasets of the plurality of predetermined datasets (e.g., stored in the table) identified in act 1002. For example, the head unit compares a name of a WiFi access point, a name of a WiFi router, a name of a WiFi network, a location such as an address included with the new component signal to the plurality of datasets to determine if there is a match. In one embodiment, the head unit (e.g., the processor of the head unit) calculates a location of the head unit, for example, based on the new component signal received in act 1004, and compares the calculated location of the head unit to the plurality of predetermined datasets.

For example, the auxiliary data may include a plurality of GPS signals, and the head unit, for example, may triangulate or trilaterate a location (e.g., a longitude and a latitude) of the head unit. A match between the calculated location of the head unit and one or more predetermined datasets of the plurality of predetermined datasets may be identified when a difference between the calculated location of the head unit and a location included within a predetermined dataset of the plurality of predetermined datasets is less than a predetermined threshold difference. For example, a match between the calculated location of the head unit and a location included within the predetermined dataset may be identified when a difference between respective longitudes is less than a first predetermined threshold difference and a difference between respective latitudes is less than a second predetermined threshold difference.

If, in act 1006, the head unit determines the identification data included within the new component signal received in act 1004 is included within one or more datasets of the plurality of predetermined datasets identified in act 1002, the method 1000 moves to act 1008 (e.g., identifies a match). If, in act 1006, the head unit determines the identification data included within the new component signal received in act 1004 is not included within one or more datasets of the plurality of predetermined datasets identified in act 1002, the method 1000 moves to act 1012.

In act 1008, the head unit (e.g., the processor of the head unit) identifies one or more bicycles of the plurality of bicycles associated with the user based on the identified match of act 1006. Each dataset of the plurality of predetermined datasets may include identification data for one or more electronic components included on the bicycle represented by the respective dataset, and bicycle identification data for the bicycle represented by the respective dataset (e.g., "bike_2" and/or "gravel bike"). For example, referring to the example of FIG. 9, with matched identification data of "rear_derailleur_607" (e.g., included within the new component signal received in act 1004 and a second dataset of the plurality of predetermined datasets), "bike_2" and/or "gravel bike" is identified from the plurality of predetermined datasets (e.g., the table) as corresponding to the matched identification data.

In one embodiment, two or more bicycles of the plurality of bicycles may be identified in act 1008. For example, two or more datasets of the plurality of predetermined datasets may include the identification data included within the new component signal received in act 1004.

In act 1010, the head unit displays representations of the one or more bicycles identified in act 1008. The head unit includes, for example, a display (e.g., a touchscreen), and the display of the head unit displays the representations of the one or more bicycles. The representations of the one or more bicycles may be included within a list displayed at the display of the head unit, for example. For example, the list displayed at the display of the head unit may include bicycle identification data (e.g., "bike_2" and/or "gravel bike") corresponding to the one or more bicycles identified in act 1008.

Additional and/or different representations of the one or more bicycles identified in act 1008 may be displayed at the display of the head unit, for example. In one embodiment, the display of the head unit displays images instead of or in addition to the list. For example, the display of the head unit may display an image (e.g., a photograph or an icon) of "bike_2" instead of or in addition to the text "gravel bike," for example.

In act 1012, the head unit (e.g., the processor of the head unit) determines whether a bicycle has been selected from the representations of the one or more bicycles displayed in act 1010. The user may interact with the head unit, for example, to select one of the representations, and the head unit determines whether the bicycle has been selected from the representations of the one or more bicycles displayed in act 1010 based on whether and what user input is received. For example, the user may select one of the representations by interacting with the touch screen of the head unit, by interacting with (e.g., pressing) one or more buttons of the head unit or another component of the bicycle (e.g., a shifter), and/or via one or more other interactions with the head unit, and the processor of the head unit may generate a signal based on the user input (e.g., a user input signal). The processor of the head unit may then determine whether a bicycle has been selected from the representations of the one or more bicycles displayed in act 1010 based on the user input signal.

If, in act 1012, the head unit determines a bicycle has been selected from the representations of the one or more bicycles displayed in act 1010, the method 1000 moves to act 1014. If, in act 1012, the head unit determines a bicycle has not been selected from the representations of the one or more bicycles displayed in act 1010, the method 1000 returns to act 1004.

In act 1014, the head unit (e.g., the processor of the head unit) configures components the bicycle based on the bicycle selected in act 1012. The head unit, for example, may configure the bicycle after the head unit is paired into a network connecting the electronic components of the bicycle. For example, the memory of the head unit and/or one or more other memories (e.g., a memory of the Cloud) may store configuration data corresponding to the selected bicycle, and the head unit may identify the configuration data in response to the bicycle selection in act 1012. For example, the head unit may retrieve at least some of the configuration data for the bicycle from the memory of the head unit and/or may request at least some of the configuration data for the bicycle from the Cloud.

The configuration data may include data (e.g., preferred settings) for any number of components of the bicycle. For example, the configuration data may include data for an initial setting for a rear derailleur, a front derailleur, a suspension, a seat post assembly, and/or one or more other components of the bicycle. Alternatively or additionally, the configuration data may identify parameters for automatic shifting, and/or may identify one or more sensors of the bicycles, from which data is to be tracked (e.g., saved) and/or displayed. The configuration data may include more, less, and/or different data.

When, in act 1012, the head unit determines a bicycle has not been selected from the representations of the one or more bicycles displayed in act 1010, and the method 1000 returns to act 1004, acts 1004-1012 may be repeated for another new component signal (e.g., corresponding to a front derailleur) received by the head unit, for example. Acts 1004-1012 may be repeated any number of times for any number of received new component signals corresponding to any number of components (e.g., electronic components) of the bicycle.

In one embodiment, the list displayed at the display of the head unit, for example, is pared down as new component signals are received by the head unit and compared to the plurality of predetermined datasets. For example, after the first new component signal is received by the head unit and compared to the plurality of predetermined datasets, three datasets (e.g., corresponding to three different bicycles) of the plurality of predetermined datasets may be identified as including the identification data (e.g., corresponding to a type of rear derailleur) included in the first new component signal (e.g., identified as candidate bicycles). When a second new component signal is received by the head unit (e.g., in repeated act 1004), the identification data included in the second new component signal is compared to, for example, the three datasets identified with the first new component signal. For example, two datasets (e.g., corresponding to two different bicycles) of the originally identified three datasets may include the identification data (e.g., corresponding to a type of front derailleur) included in the second new component signal. Acts 1004-1012 may be repeated until the list displayed at the display of the head unit is pared down to a single bicycle.

In another embodiment, acts 1004-1008 are repeated each time a new component signal is received by the head unit, and the list is not displayed (e.g., in act 1010) until all new component signals have been received by the head unit. In other words, the list is not pared down as more new component signals are received.

Figure 11:
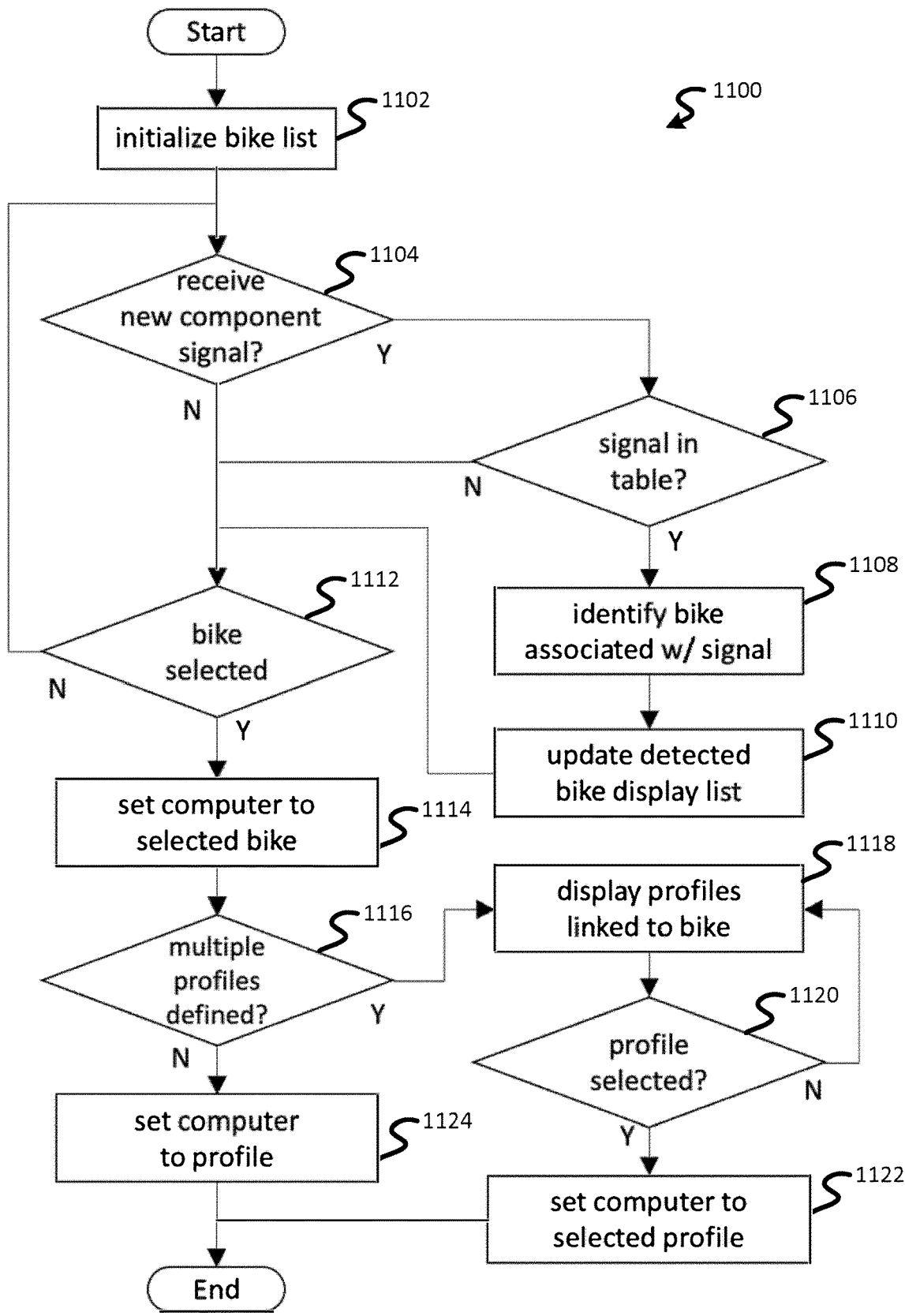
FIG. 11 is a flow chart of an embodiment of a method for detecting a unique bicycle system and identifying a user profile for the unique bicycle system.

FIG. 11 illustrates a method 1100 for detecting a unique bicycle (e.g., corresponding to the system 500, the system 600, or the system 700) and a user profile (e.g., a first user profile; a first profile) for the unique bicycle. The method 1100 may be executed, for example, when a head unit is first paired into a network of the bicycle, when electronic components of the bicycle are woken up (e.g., when the user shakes the bicycle and, based on sensor data identifying movement of the bicycle, the electronic components of the bicycle are woken up), once the user starts riding the bicycle (e.g., as the electronic components transmit data, including identification data, to the head unit over the course of a ride), and/or based on user input. In one embodiment, a first part of the method 1100 is executed when the head unit is first paired into the network of the bicycle, and a second part of the method 1100 is executed at a later time (e.g., in response to detection of a riding scenario, such as exceeding a predetermined speed). The acts of the method 1100 presented below are intended to be illustrative. In some embodiments, the method 1100 may be accomplished with one or more additional acts not described, and/or without one or more of the acts discussed. Additionally, the order in which the acts of the method 1100 are illustrated in FIG. 11 and described below is not intended to be limiting.

In some embodiments, the method 1100 may be implemented in one or more processing devices (e.g., a digital processor, an analog processor, a digital circuit designed to process information, an analog-circuit designed to process information, a state machine, and/or other mechanisms for electronically processing information). The one or more processing devices include one or more devices executing some or all the acts of the method 1100 in response to instructions stored electronically on an electronic storage medium. The one or more processing devices are configured through hardware, firmware, and/or software to be specifically designed for execution of one or more of the acts of the method 1100. As presented in the following, acts may be performed using any combination of the components indicated in FIGS. 1A-1E, 2A-2C, 3-7, and/or other components.

The acts of a first part of the method may correspond to the acts 1002-1014 of the method 1000 of FIG. 10. For example, in act 1102, a processor (e.g., a first processor) of a first electronic component of a bicycle identifies a plurality of predetermined datasets for a plurality of bicycles, respectively. In other words, the first processor of the first electronic component of the bicycle initializes a list of bicycles (e.g., representing the plurality of bicycles). For example, the first electronic component of the bicycle identifies a table (e.g., a first table) associated with a user. The table may store the plurality of predetermined datasets for the plurality of bicycles in separate rows or columns of the table, respectively. The plurality of predetermined datasets may have been previously generated and stored using, for example, the method 800 of FIG. 8. Each predetermined dataset of the plurality of predetermined datasets includes identification data for at least one bicycle component of the respective bicycle. For example, the identification data identifies one or more unique bicycle components (e.g., a rear derailleur, a front derailleur, a first controller device, and a second controller device) for each bicycle of the plurality of bicycles.

In act 1104, the first electronic component (e.g., a processor of a head unit) determines whether a new component signal has been received. The new component signal may, for example, be for one of the electronic components of the bicycle. For example, the new component signal may include data representing a type of bicycle component (e.g., "front derailleur") the one electronic component is and/or an identification number (e.g., a unique identification number) corresponding to the one electronic component (e.g., identification data).

If the processor of the head unit determines, in act 1104, that a new component signal has been received, the method 1100 moves to act 1106. If the processor of the head unit determines, in act 1104, that a new component signal has not been received, the method 1100 moves to act 1112.

In act 1106, the head unit (e.g., the processor of the head unit) determines whether the identification data included within the new component signal received in act 1104 is included in one or more datasets of the plurality of predetermined datasets (e.g., the table) identified in act 1102. For example, referring to the example of FIG. 9, the new component signal received in act 1104 may include the identification data "rear_derailleur_607," which corresponds to "bike_2," or "gravel bike," in the table.

If, in act 1106, the head unit determines the identification data included within the new component signal received in act 1104 is included within one or more datasets of the plurality of predetermined datasets identified in act 1102, the method 1100 moves to act 1108 (e.g., identifies a match). If, in act 1106, the head unit determines the identification data included within the new component signal received in act 1104 is not included within one or more datasets of the plurality of predetermined datasets identified in act 1102, the method 1100 moves to act 1112.

In act 1108, the head unit (e.g., the processor of the head unit) identifies one or more bicycles of the plurality of bicycles associated with the user based on the identified match of act 1106 (e.g., "bike_2" and/or "gravel bike"). In act 1110, the head unit displays representations of the one or more bicycles identified in act 1108 (e.g., within a list displayed at the display of the head unit).

In act 1112, the head unit (e.g., the processor of the head unit) determines whether a bicycle has been selected from the representations of the one or more bicycles displayed in act 1110. The user may interact with the head unit, for example, to select one of the representations, and the head unit determines whether the bicycle has been selected from the representations of the one or more bicycles displayed in act 1110 based on whether and what user input is received.

If, in act 1112, the head unit determines a bicycle has been selected from the representations of the one or more bicycles displayed in act 1110, the method 1100 moves to act 1114. If, in act 1112, the head unit determines a bicycle has not been selected from the representations of the one or more bicycles displayed in act 1110, the method 1100 returns to act 1104.

In act 1114, the head unit (e.g., the processor of the head unit) configures the bicycle based on the bicycle selection in act 1112. For example, types of information to be tracked and/or displayed at the head unit may be defined based on the bicycle selected in act 1112. For example, a memory of the head unit and/or one or more other memories (e.g., a memory of the Cloud) may store configuration data corresponding to the selected bicycle, and the head unit may identify the configuration data in response to the bicycle selection in act 1112.

The configuration data may include data (e.g., preferred settings) for any number of components of the bicycle. For example, the configuration data may include data for an initial setting for the head unit (e.g., what data to display), a rear derailleur, a front derailleur, a suspension, a seat post assembly, and/or one or more other components of the bicycle. The configuration data may include more, less, and/or different data.

When, in act 1112, the head unit determines a bicycle has not been selected from the representations of the one or more bicycles displayed in act 1110, and the method 1100 returns to act 1104, acts 1104-1112 may be repeated for another new component signal (e.g., corresponding to a front derailleur) received by the head unit, for example. Acts 1104-1112 may be repeated any number of times for any number of received new component signals corresponding to any number of components (e.g., electronic components) of the bicycle.

In act 1116, the head unit (e.g., the processor of the head unit) determines if a plurality of profiles are defined for the bicycle selected in act 1112. The memory of the head unit or another memory (e.g., a memory of the Cloud) may store one or more profiles for each bicycle of the plurality of bicycles represented by the plurality of predetermined datasets (e.g., within the first table), respectively.

The profiles may, for example, be stored in a second table. Referring to the example of FIG. 12, when, for example, "bike_2" and/or "gravel bike" is selected in act 1112, the head unit (e.g., the processor of the head unit) identifies that two profiles (e.g., "1st profile" and "2nd profile") are associated with the selected bicycle. When, for example, "bike_3" and/or "mountain bike" is selected in act 1112, the head unit identifies that one profile (e.g., "1st profile") is associated with the selected bicycle.

Each of the profiles may specify data (e.g., types of data) to be displayed at the head unit. The types of data to be displayed may include any number of different types of data including, for example, a heart rate of the rider, power, a gear setting, an inclination of the bicycle, and/or one or more other types of data. The types of data to be displayed may include more, less, and/or different data.

Alternatively or additionally, the profiles may specify configuration data. The configuration data may be additional to or different than the configuration data identified in act 1114. The configuration data may include data (e.g., preferred settings) for any number of components of the bicycle. For example, the configuration data may include data for a setting for a rear derailleur, a front derailleur, a suspension, a seat post assembly, and/or one or more other components of the bicycle. The configuration data may include more, less, and/or different data. Alternatively or additionally, the configuration data may identify parameters for automatic shifting, and/or may identify one or more sensors of the bicycles, from which data is to be tracked (e.g., saved) and/or displayed.

If, in act 1116, the head unit determines that a plurality of profiles are defined for the bicycle selected in act 1112 (e.g., based on a number of profiles stored in the second table for the selected bicycle), the method 1100 moves to act 1118. If, in act 1116, the head unit determines that a plurality of profiles are not defined for the bicycle selected in act 1112, the method 1100 moves to act 1124.

In act 1118, the head unit displays representations of the plurality of profiles identified in act 1116. The display (e.g., a touchscreen) of the head unit, for example, displays the representations of the plurality of profiles. The representations of the plurality of profiles may be included within a list displayed at the display of the head unit, for example. For example, with reference to the example of FIG. 12, when, for example, "bike_2" and/or "gravel bike" is selected in act 1112, the head unit may display the representations of the "1st profile" and "2nd profile" within the list at the display of the head unit. The head unit may display more and/or different information than the "1st profile" and "2nd profile" within the list. For example, information that allows the user to identify a rider, a riding scenario, and/or displayed types of data associated with the "1st profile" and "2nd profile," for example, may be displayed within the list. For example, the list displayed at the display of the head unit may include "1st profile—flat" and "2nd profile—hills," or may include "1st profile—Bob" and "2nd profile—Mary." Other information may be included within the representations.

Additional and/or different representations of the plurality of profiles identified in act 1116 may be displayed at the display of the head unit, for example. In one embodiment, the display of the head unit displays images instead of or in addition to the list. For example, the display of the head unit may display an image (e.g., a photograph or an icon) of a rider associated with the "1st profile" (e.g., a picture of Bob) and an image (e.g., a photograph or an icon) of a rider associated with the "2nd profile" (e.g., a picture of Mary) instead of or in addition to the text "1st profile" and "2nd profile," respectively.

In act 1120, the head unit (e.g., the processor of the head unit) determines whether a profile has been selected from the representations of the plurality of profiles displayed in act 1118. The user may interact with the head unit, for example, to select one of the representations, and the head unit determines whether the profile has been selected from the representations of the plurality of profiles displayed in act 1118 based on whether and what user input is received. For example, the user may select one of the profiles by interacting with the touch screen of the head unit, by interacting with (e.g., pressing) one or more buttons of the head unit or another component of the bicycle (e.g., a shifter), and/or via one or more other interactions with the head unit, and the processor of the head unit may generate a signal based on the user input (e.g., a user input signal). The processor of the head unit may then determine whether a profile has been selected from the representations of the plurality of profiles displayed in act 1118 based on the user input signal.

If, in act 1120, the head unit determines a profile has been selected from the representations of the plurality of profiles displayed in act 1118, the method 1100 moves to act 1122. If, in act 1120, the head unit determines a profile has not been selected from the representations of the plurality of profiles displayed in act 1118, the method 1100 returns to act 1118 and waits for a selection (e.g., until a timeout).

In act 1122, at least the head unit (e.g., the processor of the head unit) is configured (e.g., what data is to be displayed) based on the profile identified in act 1120. For example, the head unit may be configured to display one or more different types of data (e.g., power generated from sensor data, a heart rate of the rider, a current gear) based on the profile identified in act 1120.

Additionally or alternatively, the head unit may configure components the bicycle based on the profile identified in act 1120. For example, the profile identified in act 1120 may include data (e.g., preferred settings) for any number of components of the bicycle. For example, the configuration data may include data for a setting for a rear derailleur, a front derailleur, a suspension, a seat post assembly, and/or one or more other components of the bicycle. At least some of the configuration data identified in act 1114 may be replaced by the configuration data identified in act 1122.

Alternatively or additionally, the profile identified in act 1120 may identify parameters for automatic shifting, and/or may identify one or more sensors of the bicycle, from which data is to be tracked (e.g., saved) and/or displayed. The profile identified in act 1120 may include more, less, and/or different data.

In act 1124, at least the head unit is configured (e.g., what data is to be displayed) based on the single profile identified in act 1116. For example, the head unit may be configured to display one or more different types of data (e.g., power generated from sensor data, a heart rate of the rider, a current gear) based on the profile identified in act 1116. Additionally or alternatively, the head unit may configure components of the bicycle, may identify parameters for automatic shifting, and/or may identify one or more sensors of the bicycle, from which data is to be tracked (e.g., saved) and/or displayed based on the profile identified in act 1116.

Figure 13:
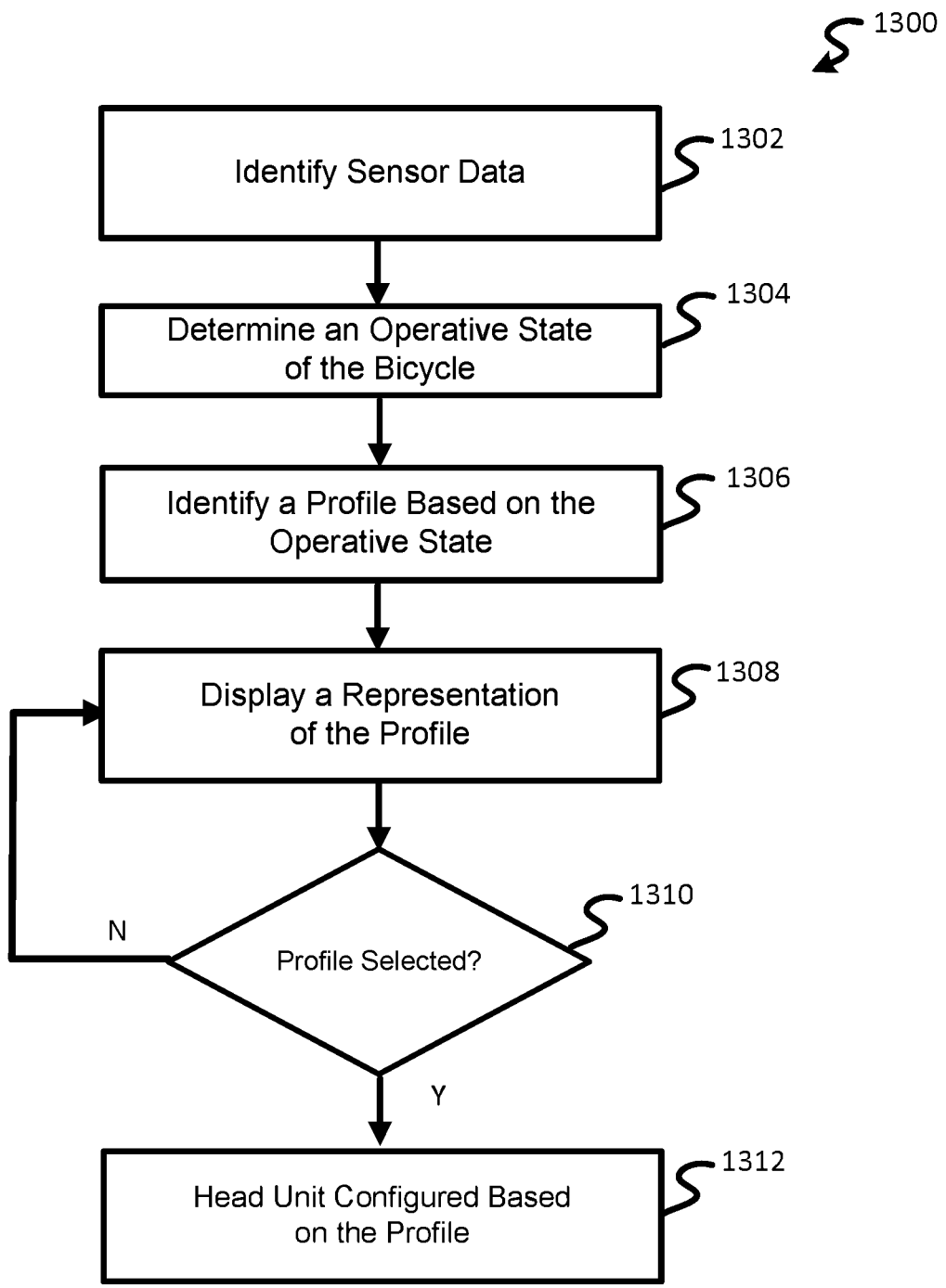
FIG. 13 is a flow chart of an embodiment of a method identifying another user profile for the unique bicycle system.

FIG. 13 illustrates a method 1300 for identifying a user profile (e.g., a second user profile; a second profile) for a bicycle that is already identified by a head unit. The method 1300 may be executed, for example, after the head unit is paired into a network of the bicycle and, for example, a rider has started riding the bicycle. In one embodiment, the method 1300 is executed after the method 1100 of FIG. 11. For example, the method 1300 is executed in response to detection of a signature event (e.g., a personal or performance-based signature event; an operative state of the bicycle; in response to detection of a riding scenario, such as exceeding a predetermined speed). The acts of the method 1300 presented below are intended to be illustrative. In some embodiments, the method 1300 may be accomplished with one or more additional acts not described, and/or without one or more of the acts discussed. Additionally, the order in which the acts of the method 1300 are illustrated in FIG. 13 and described below is not intended to be limiting.

In some embodiments, the method 1300 may be implemented in one or more processing devices (e.g., a digital processor, an analog processor, a digital circuit designed to process information, an analog-circuit designed to process information, a state machine, and/or other mechanisms for electronically processing information). The one or more processing devices include one or more devices executing some or all the acts of the method 1300 in response to instructions stored electronically on an electronic storage medium. The one or more processing devices are configured through hardware, firmware, and/or software to be specifically designed for execution of one or more of the acts of the method 1300. As presented in the following, acts may be performed using any combination of the components indicated in FIGS. 1A-1E, 2A-2C, 3-7, and/or other components.

In one embodiment, acts of the method 1300 may be performed after act 1122 or act 1124 of the method 1100 have been performed. For example, the head unit (e.g., the processor of the head unit) may monitor sensor data generated by one or more sensors of the bicycle during a ride, and may identify another user profile (e.g., the second user profile) based on the monitored sensor data during the ride. In act 1302, the head unit (e.g., the processor of the head unit) identifies sensor data from one or more sensors (e.g., of the bicycle; of one or more component of the bicycle). The sensor data may be transmitted from the one or more sensors to the head unit, or may be stored in a memory (e.g., of a component of the bicycle) and retrieved from the memory by the head unit.

The one or more sensors may include any number of sensors configured to sense any number of different types of data. For example, the one or more sensors may include a power meter of the bicycle, and the sensed data may include output power data (e.g., at a crankshaft of the bicycle). As another example, the one or more sensors may include a pressure sensor of a seatpost system (e.g., a seatpost assembly), and the sensed data may include pressure data within the seatpost system. As yet another example, the one or more sensors may include an accelerometer, and the sensed data may include acceleration data and/or velocity data (e.g., for the bicycle). As another example, the one or more sensors may include a gyroscope, and the sensed data may include inclination data (e.g., for the bicycle). The one or more sensors may include additional, fewer, and/or different sensors.

In act 1304, the head unit (e.g., the processor of the head unit) determines an operative state of the bicycle based on the sensor data identified in act 1302. The operative state of the bicycle may relate to a configuration of a component of the bicycle, a speed, acceleration, and/or orientation of the bicycle, and/or a rider of the bicycle (e.g., how much pressure is being applied to a seat of the seatpost system).

As an example, the head unit may determine an output power being applied by the rider based on the sensor data identified in act 1302 (e.g., the output power data). As another example, the head unit may determine a pressure applied to the seat of the seatpost system (e.g., corresponding to a weight of the rider) based on the sensor data identified in act 1302 (e.g., the pressure data). As yet another example, the head unit may determine a speed and/or an acceleration of the bicycle based on the sensor data identified in act 1302 (e.g., the acceleration data and/or the velocity data). As another example, the head unit may determine an inclination of the bicycle based on the sensor data identified in act 1302 (e.g., the inclination data).

Additional and/or different operative states of the bicycle may be determined. For example, the one or more sensors may track inclination of the bicycle over a predetermined period of time to identify an operative state of the bicycle being ridden on an uneven surface (e.g., a trail) or on hills. For example, the head unit (e.g., the processor of the head unit) may determine the operative state of the bicycle being ridden on the uneven surface based on a change of the inclination and/or a number of times the inclination of the bicycle changes by at least a particular angle over the predetermined period of time.

As another example, the one or more sensors may track the output power being applied by the rider of the bicycle over a predetermined period of time to identify the rider being engaged in interval training (e.g., cyclical increasing and decreasing of output power). For example, the head unit (e.g., the processor of the head unit) may determine the operative state of the rider being engaged in interval training based a number of times the output power being applied by the rider of the bicycle changes by at least a particular amount over the predetermined time period.

In act 1306, the head unit (e.g., the processor of the head unit) identifies a profile (e.g., the second profile) from a plurality of profiles (e.g., stored at the memory or another memory, such as of the Cloud) based on the operative state of the bicycle determined in act 1304. The second profile may supplement and/or at least partially replace the identified first profile. For example, the first profile (e.g., identified in the method 1100 of FIG. 11) may be a rider profile that corresponds to a particular rider of the bicycle, and the second profile (e.g., identified in the method 1300 of FIG. 13) may be a riding profile that corresponds to an operative state of the bicycle. In one embodiment, the head unit identifies two or more profiles from the plurality of profiles in act 1306.

As discussed above, the memory of the head unit or another memory (e.g., a memory of the Cloud) may store one or more profiles for each bicycle of the plurality of bicycles represented by the plurality of predetermined datasets (e.g., within the first table), respectively. The head unit may identify the profile from the plurality of profiles stored in the second table, for example. In one embodiment, the head unit identifies the profile from a plurality of profiles of another table (e.g., a third table) stored in the memory or another memory (e.g., of the Cloud).

As discussed above, the profiles may, for example, specify data (e.g., types of data) to be displayed at the head unit. The types of data to be displayed may include any number of different types of data including, for example, a heart rate of the rider, power, a gear setting, an inclination of the bicycle, and/or one or more other types of data. The types of data to be displayed may include more, less, and/or different data. Also as discussed above, alternatively or additionally, the profiles may specify configuration data that may include, for example, data (e.g., preferred settings) for any number of components of the bicycle. For example, the configuration data may include data for a setting for the head unit (e.g., what data to display), a rear derailleur, a front derailleur, a suspension, a seat post assembly, and/or one or more other components of the bicycle. The configuration data may include more, less, and/or different data. Alternatively or additionally, the configuration data may identify parameters for automatic shifting, and/or may identify one or more sensors of the bicycles, from which data is to be tracked (e.g., saved) and/or displayed.

The profiles may also include, in addition to the specified data to be displayed and/or the configuration data, at least one signature event (e.g., a profile signature event corresponding to an operative state of the bicycle; a predetermined operative state of the bicycle) that identifies when a particular profile is to be presented to the user at the display of the head unit, for example, and/or automatically used to set the head unit and/or one or more other components of the bicycle.

In act 1306, the head unit (e.g., the processor of the head unit) may compare the operative state of the bicycle determined in act 1304 to the signature events of the profiles of the second table, respectively, and identify a profile of the plurality of profiles based on the comparison. For example, referring to the example of FIG. 12, after "bike_2," the "gravel bike," is selected (e.g., in act 1112 of the method 1100 of FIG. 11) and the "1st profile" is selected (e.g., in act 1120 of the method 1100 of FIG. 11), while the rider is on the ride, the head unit may determine, based on the operative state determined in act 1304, the bicycle is being ridden on hills. The profile signature event of the "2nd profile" for the "gravel bike" may be "hills," and the head unit may identify a match of the operative state determined in act 1304 (e.g., the bicycle being ridden on hills) with the profile signature event of the "2nd profile" for the "gravel bike." Accordingly, the head unit may identify the "2nd profile" for the "gravel bike" from the plurality of profiles stored in the second table in act 1306. In other riding scenarios and/or with other bicycles, the head unit may identify other matching operative states (e.g., determined in act 1304) and profile signature events (e.g., identified in act 1306) corresponding to other profiles of the plurality of profiles.

For example, the operative state of the bicycle determined in act 1304 may be defined by the sensor data identified in act 1302 (e.g., the operative state of a particular speed of the bicycle is defined by speed data identified from a speed sensor or calculated from acceleration data from an accelerometer). In act 1306, the head unit may compare the sensor data identified in act 1302 or a value calculated from the sensor data to the profile signature events identified in act 1306.

In one embodiment, in act 1302, the head unit (e.g., the processor of the head unit), for example, identifies output power data from a power meter of the bicycle and, in act 1306, compares the identified output power data with at least some of the profile signature events of the plurality of profiles. For example, a profile (e.g., the second profile) for a selected bicycle (e.g., "3rd profile" for the "TT road bike", "bike_2," of FIG. 12) may include, as a profile signature event, an output power threshold (e.g., 200 W). The head unit may, in act 1306, compare the output power data identified in act 1302 to profiles of the plurality of profiles (e.g., corresponding to the selected bicycle) that include a profile signature event related to output power threshold. The head unit may identify, in act 1306, the profile (e.g., "3rd profile" for the "TT road bike" of FIG. 12) from the plurality of profiles based on the comparison(s). For example, the head unit may identify the profile from the plurality of profiles when the output power data identified in act 1302 is greater than the output power threshold included, as a profile signature event, in the profile. In one embodiment, the head unit identifies the profile from the plurality of profiles when the output power data identified in act 1302 is less than the output power threshold included in the profile.

In another embodiment, in act 1302, the head unit (e.g., the processor of the head unit), for example, identifies pressure data from a pressure sensor of the bicycle (e.g., a seatpost system of the bicycle) and, in act 1306, compares the identified pressure data with at least some of the profile signature events of the plurality of profiles. For example, a profile (e.g., the second profile) for a selected bicycle may include, as a profile signature event, a pressure threshold. The head unit may, in act 1306, compare the pressure data identified in act 1302 to profiles of the plurality of profiles (e.g., corresponding to the selected bicycle) that include a profile signature event related to a pressure threshold. The head unit may identify, in act 1306, the profile from the plurality of profiles based on the comparison(s). For example, the head unit may identify the profile from the plurality of profiles when the pressure data identified in act 1302 is greater than the pressure threshold included, as a profile signature event, in the profile. In one embodiment, the head unit identifies the profile from the plurality of profiles when the pressure data identified in act 1302 is less than the pressure threshold included in the profile.

In yet another embodiment, in act 1302, the head unit (e.g., the processor of the head unit), for example, identifies acceleration data from an acceleration sensor (e.g., an accelerometer) of the bicycle and. The head unit, for example, calculates a speed of the bicycle from the acceleration data (e.g., integrates values of the acceleration data over a predetermined period of time) as the operative state of the bicycle (e.g., in act 1304), and compares the calculated speed with at least some of the profile signature events of the plurality of profiles. For example, a profile (e.g., the second profile) for a selected bicycle may include, as a profile signature event, a speed threshold. The head unit may, in act 1306, compare the speed calculated in act 1304 to profiles of the plurality of profiles (e.g., corresponding to the selected bicycle) that include a profile signature event related to a speed threshold. The head unit may identify, in act 1306, the profile from the plurality of profiles based on the comparison(s). For example, the head unit may identify the profile from the plurality of profiles when the speed calculated in act 1304 is greater than the speed threshold included, as a profile signature event, in the profile. In one embodiment, the head unit identifies the profile from the plurality of profiles when the speed calculated in act 1304 is less than the speed threshold included in the profile. Additional and/or different sensor data and/or calculated values may be compared to additional and/or different profile signature events.

In act 1308, the head unit displays a representation of the profile identified in act 1306. The display (e.g., a touchscreen) of the head unit, for example, displays the representation of the profile identified in act 1306. In one embodiment, in which the head unit identifies two or more profiles from the plurality of profiles in act 1306, the head unit displays the two or more representations of the two or more profiles, respectively, within a list at the display of the head unit, for example.

In act 1310, the head unit (e.g., the processor of the head unit) determines whether a profile has been selected from the representation(s) of the profile(s) displayed in act 1308. The user may interact with the head unit, for example, to select a representation, and the head unit determines whether the profile has been selected from the representation(s) displayed in act 1308 based on whether and what user input is received. For example, the user may select the profile by interacting with the touch screen of the head unit, by interacting with (e.g., pressing) one or more buttons of the head unit or another component of the bicycle (e.g., a shifter), and/or via one or more other interactions with the head unit, and the processor of the head unit may generate a signal based on the user input (e.g., a user input signal). The processor of the head unit may then determine whether the profile has been selected from the representation(s) displayed in act 1308 based on the user input signal.

If, in act 1310, the head unit determines a profile has been selected from the representation(s) displayed in act 1308, the method 1300 moves to act 1312. If, in act 1310, the head unit determines a profile has not been selected from the representation(s) displayed in act 1308, the method 1300 returns to act 1308 and waits for a selection (e.g., until a timeout).

In act 1312, at least the head unit is configured (e.g., what data is to be displayed) based on the profile identified in act 1310. For example, the head unit may be configured to display one or more different types of data (e.g., power generated from sensor data, a heart rate of the rider, a current gear) based on the profile identified in act 1310. At least some of the data to be displayed, identified by the second profile selected in act 1310, may be in addition to or may replace some or all of the data to be displayed identified by the first profile selected in the method 1100 of FIG. 11.

For example, with reference to the example of FIG. 12 (e.g., the "1st profile" and the "second profile" for the "TT road bike"), the data to be displayed, as identified by the first profile, may include "power" and "gear," while the data to be displayed, as identified by the second profile, may include "power" and "heart rate." Accordingly, after the execution of the method 1300, "power" may still be displayed, while "heart rate" replaces "gear."

Additionally or alternatively, the head unit may configure components of the bicycle based on the profile identified in act 1310 (e.g., the second profile). For example, the profile identified in act 1310 may include data (e.g., preferred settings) for any number of components of the bicycle. For example, the configuration data may include data for a setting for a rear derailleur, a front derailleur, a suspension, a seat post assembly, and/or one or more other components of the bicycle. At least some of the configuration data of the second profile selected in act 1310 may be in addition to or may replace some or all of the configuration data identified in, for example, act 1114 and/or act 1122 of the method 1100 of FIG. 11.

Alternatively or additionally, the profile identified in act 1310 may identify parameters for automatic shifting, and/or may identify one or more sensors of the bicycle, from which data is to be tracked (e.g., saved) and/or displayed. The profile identified in act 1310 may include more, less, and/or different data.

In one embodiment, the method 1300 does not include act 1308. Instead, the head unit automatically configures the head unit and/or one or more components of the bicycle based on the profile identified in act 1306. The method 1300 may be repeated any number of times for any instance of an operative state of the bicycle (e.g., determined in a repeated act 1304) matching a signature event of one or more profiles corresponding to a selected bicycle.

In accordance with various embodiments of the present disclosure, the methods described herein may be implemented with software programs executable by a computer system, such as the head unit 130 or the head unit 240. Further, in an exemplary, non-limited embodiment, implementations can include distributed processing, component/object distributed processing, and parallel processing. Alternatively, virtual computer system processing can be constructed to implement one or more of the methods or functionalities as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device 150 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device 150 is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A controller device for a bicycle, the controller device comprising:
 a communication interface configured to receive component data from another controller device of the bicycle; and
 a processor in communication with the communication interface, the processor being configured to:
  identify the bicycle based on the received component data;
  identify sensor data from a sensor;
  determine an operative state of the bicycle based on the identified sensor data; and
  identify a user profile from a plurality of user profiles based on the determined operative state of the bicycle; and
 a display in communication with the processor,
 wherein the display is configured to display one or more predetermined types of data based on the identified user profile, the processor is further configured to initiate configuration of one or more components of the bicycle based on the identified user profile, or a combination thereof.

2. The controller device of claim 1, further comprising a memory configured to store the plurality of user profiles, each user profile of the plurality of user profiles identifying at least one predetermined type of data to be displayed, a configuration for at least one component of the bicycle, or a combination thereof.

3. The controller device of claim 2, wherein each user profile of the plurality of user profiles also includes one or more predetermined operative states, and
wherein the identification of the user profile from the plurality of user profiles comprises:
comparison of the identified sensor data to the respective one or more predetermined operative states for the user profile; and
identification of the user profile from the plurality of user profiles based on the comparison.

4. The controller device of claim 3, wherein the user profile is a profile specific to a particular rider of the bicycle, a profile specific to a riding scenario of the bicycle, or a profile specific to the particular rider and the riding scenario of the bicycle.

5. The controller device of claim 4, wherein the sensor is a power meter of the bicycle, the identified sensor data includes output power data, and the respective one or more predetermined operative states for the user profile include a predetermined threshold output power,
wherein the comparison of the identified sensor data to the respective one or more predetermined operative states for the user profile comprises comparison of the output power data to the predetermined threshold output power, and
wherein the identification of the user profile from the plurality of user profiles based on the comparison comprises identification of the user profile from the plurality of user profiles when, based on the comparison, an output power of the output power data is greater than the predetermined threshold output power.

6. The controller device of claim 4, wherein the sensor is a sensor of a seatpost system, the identified sensor data includes pressure data within the seatpost system, and the respective one or more predetermined operative states for the user profile includes a predetermined threshold pressure,
wherein the comparison of the identified sensor data to the respective one or more predetermined operative states for the user profile comprises comparison of a pressure of the pressure data within the seatpost system to the predetermined threshold pressure, and
wherein the identification of the user profile from the plurality of user profiles based on the comparison comprises identification of the user profile from the plurality of user profiles when, based on the comparison, the pressure within the seatpost system is greater than the predetermined threshold pressure.

7. The controller device of claim 4, further comprising the sensor, the sensor including an accelerometer,
wherein the identified sensor data includes acceleration data from the accelerometer, and the respective one or more predetermined operative states for the user profile includes a predetermined threshold speed,
wherein the processor is further configured to determine a speed of the bicycle based on the acceleration data from the accelerometer,
wherein the comparison of the identified sensor data to the respective one or more predetermined operative states for the user profile comprises comparison of the determined speed of the bicycle to the predetermined threshold speed, and
wherein the identification of the user profile from the plurality of user profiles based on the comparison comprises identification of the user profile from the plurality of user profiles when, based on the comparison, the determined speed of the bicycle is greater than the predetermined threshold speed.

8. The controller device of claim 7, wherein the controller device is a head unit for the bicycle.

9. The controller device of claim 1, wherein the one or more predetermined types of data include power data, heart rate data for a user of the bicycle, a gearing of the bicycle, or any combination thereof.

10. The controller device of claim 1, wherein the identified user profile is a riding profile,
wherein the processor is further configured to identify two or more user profiles of the plurality of user profiles based on the identified bicycle, the two or more user profiles being rider profiles,
wherein the display is further configured to display two or more respective representations of the two or more rider profiles,
wherein the processor is further configured to:
receive a user input selecting a representation of the displayed two or more respective representations, the selected representation corresponding to a rider profile of the two or more rider profiles, and
wherein the display is configured to display at least one predetermined type of data based on the selected rider profile, the processor is further configured to initiate configuration of at least one component of the bicycle based on the selected rider profile, or a combination thereof.

11. The controller device of claim 10, wherein the rider profile is identified after the rider profile is selected.

12. A computer-implemented method for identifying a user profile from a plurality of user profiles associated with a bicycle, the computer-implemented method comprising:
receiving, by a processor of a head unit of the bicycle, component data from a controller device of the bicycle;
identifying, by the processor, the bicycle based on the received component data;
identifying, by the processor, at least one user profile of a plurality of user profiles based on the identified bicycle;
displaying, by a display in communication with the processor, at least one representation corresponding to the at least one user profile, respectively;
receiving, by the processor, a user input, the user input identifying a representation of the displayed at least one representation, the identified representation corresponding to a first user profile of the plurality of user profiles;
displaying, by the display, at least one predetermined type of data based on the identified first user profile, initiating configuration of at least one component of the bicycle based on the identified first user profile, or a combination thereof;
receiving, by the processor, sensor data from a sensor of the bicycle;
determining, by the processor, an operative state of the bicycle based on the identified sensor data;

identifying, by the processor, a second user profile from the plurality of user profiles based on the determined operative state of the bicycle; and displaying one or more predetermined types of data based on the identified second user profile, initiating configuration of one or more components of the bicycle based on the identified second user profile, or a combination thereof.

\* \* \* \* \*